(12) United States Patent
Stewart et al.

(10) Patent No.: US 8,716,425 B2
(45) Date of Patent: May 6, 2014

(54) METHOD OF REDUCING STRESS RELAXATION IN POLYMER ARTICLES AND ARTICLES FORMED THEREBY

(75) Inventors: Ray F. Stewart, Emerald Lake Hills, CA (US); John G. Lahlouh, San Jose, CA (US)

(73) Assignee: Bay Materials, LLC, Menlo Park, CA (US)

( * ) Notice: Subject to any disclaimer, the term of this patent is extended or adjusted under 35 U.S.C. 154(b) by 1098 days.

(21) Appl. No.: 11/658,933

(22) PCT Filed: Jul. 29, 2005

(86) PCT No.: PCT/US2005/027289
§ 371 (c)(1),
(2), (4) Date: Jun. 19, 2009

(87) PCT Pub. No.: WO2006/015325
PCT Pub. Date: Feb. 9, 2006

(65) Prior Publication Data
US 2009/0306327 A1  Dec. 10, 2009

Related U.S. Application Data

(60) Provisional application No. 60/592,696, filed on Jul. 30, 2004, provisional application No. 60/656,640, filed on Feb. 25, 2005.

(51) Int. Cl.
*C08G 18/82* (2006.01)
*C08G 63/88* (2006.01)
*C08G 64/40* (2006.01)
*C08G 69/46* (2006.01)
*C08G 65/46* (2006.01)

(52) U.S. Cl.
USPC ............ 528/44; 523/105; 526/329.7; 528/68; 528/85; 528/196; 528/271; 528/272; 528/310; 528/322; 528/323; 528/332; 528/335; 528/350; 528/353; 528/354; 528/370; 528/403; 528/417; 528/421; 528/481; 528/503

(58) Field of Classification Search
USPC ........... 528/85, 481, 503, 353, 354, 370, 403, 528/417, 421, 44, 68, 196, 271, 272, 310, 528/322, 323, 332, 335, 350; 523/105; 526/329.7
See application file for complete search history.

(56) References Cited

U.S. PATENT DOCUMENTS

| | | | |
|---|---|---|---|
| 2,373,093 A * | 4/1945 | Baker ........................... | 264/235 |
| 3,862,288 A * | 1/1975 | Su ................. | 264/235 |
| 4,141,735 A * | 2/1979 | Schrader et al. .............. | 430/141 |
| 4,323,531 A | 4/1982 | Bradley et al. | |
| 4,376,834 A * | 3/1983 | Goldwasser et al. ......... | 521/159 |
| 4,770,944 A | 9/1988 | Farrell et al. | |
| 4,816,342 A | 3/1989 | Farrell et al. | |
| 4,847,033 A | 7/1989 | Carroll Jr. | |
| 4,900,502 A | 2/1990 | Babcock et al. | |
| 5,037,294 A * | 8/1991 | Bergersen ........................ | 433/6 |
| 5,324,743 A | 6/1994 | Dillard et al. | |
| 5,585,229 A * | 12/1996 | Kawamoto et al. ........... | 430/533 |
| 5,854,347 A | 12/1998 | Laurin et al. | |
| 6,171,758 B1 | 1/2001 | Bhateja et al. | |
| 6,375,978 B1 | 4/2002 | Kleiner et al. | |
| 6,667,351 B2 | 12/2003 | Langohr et al. | |
| 2002/0001707 A1 * | 1/2002 | Zhang et al. ............... | 428/318.6 |
| 2002/0119301 A1 * | 8/2002 | Zhang et al. ............... | 428/318.6 |

FOREIGN PATENT DOCUMENTS

| | | |
|---|---|---|
| EP | 0 674 218 | 9/1995 |
| EP | 674218 B1 * | 9/1995 |
| FR | 2 291 842 | 6/1976 |
| FR | 2291842 * | 6/1976 |
| JP | 62-85020 A * | 4/1987 |

* cited by examiner

*Primary Examiner* — Rabon Sergent
(74) *Attorney, Agent, or Firm* — Jacqueline F. Mahoney; Judy M. Mohr; McDermott Will & Emery LLP

(57) ABSTRACT

A method of improving the mechanical properties of polymers is described. The method involves heat treating the polymer at a temperature below the glass transition temperature in a wet or in a dry environment. Polymer articles capable of moisture uptake in humid environments, as well as polymer articles less susceptible to moisture uptake, have improved mechanical properties, particularly improved stress relaxation behavior and set properties, when treated in accord with the heat treatment method.

34 Claims, 32 Drawing Sheets

METHOD OF REDUCING STRESS RELAXATION IN POLYMER ARTICLES AND ARTICLES FORMED THEREBY

This application is a 35 USC §371 application of International Application No. PCT/US2005/027289 filed Jul. 29, 2005, designating the United States, which claims priority to U.S. Application No. 60/592,696 filed Jul. 30, 2004, now abandoned, and to U.S. Application No. 60/656,640 filed Feb. 25, 2005, now abandoned, all of which are hereby incorporated by reference in their entirety.

TECHNICAL FIELD

The subject matter described herein relates to a method of improving the mechanical properties of polymer articles, both elastomeric polymer articles and rigid, amorphous polymer articles. Articles formed in compliance with the method have improved dimensional stability and load bearing capability, as evidenced by reduced stress relaxation and improved set properties, respectively.

BACKGROUND

Design of products to be made from polymeric (plastic) materials requires consideration of the environment in which the product is to be used to guide selection of a polymer suitable for the end-use environment. A product designer gives consideration to properties such as optical clarity, chemical resistance, temperature resistance (both high and low), moisture uptake, modulus, etc. Preferably, the performance of the polymer in the environment of use can be ascertained to anticipate product performance and lifetime.

Properties that require consideration are polymer creep, stress relaxation, and, particularly for elastomeric articles, compression set and tensile set. Creep and stress relaxation are the main deformation mechanisms that polymers undergo. Creep of a polymer article occurs when a force is continuously applied to the article, causing it to deform gradually. The deformation of the polymer article is generally recoverable after the load is removed, but recovery takes place slowly with the polymer chains returning to their initial state. The rate at which polymers creep depends not only on the load, but also on temperature and, in general, a loaded component creeps faster at higher temperatures. Creep is readily measured using standard procedures, such as that set forth in ASTM D2990-01 or D790.

Stress relaxation is almost exclusively a characteristic of polymeric materials and is a consequence of delayed molecular motions as in creep. Contrary to creep, however, which is experienced when the load is constant, stress relaxation occurs when deformation (or strain) is constant and is manifested by a reduction in the force (stress) required to maintain a constant deformation. The degree to which stress relaxation is exhibited by a polymer depends on numerous factors such as polymer chemistry, molecular weight, type and amount of crystallinity in the polymer, temperature, environmental conditions, applied load and other factors. Often, it is not possible to readily predict what kind of stress relaxation a particular polymer material may exhibit until extensive testing and evaluation are conducted.

It is known that stress relaxation in polymers can be reduced by the addition of inorganic fillers, for example glass fibers, calcium carbonate or calcium silicate, carbon black, or other known reinforcing agents. However such reinforcing agents typically reduce ease of molding and compromise optical properties. For example addition of as little 5% of inorganic filler into a clear plastic typically gives rise to a highly opaque material. Stress relaxation can also be reduced by crosslinking a polymer, e.g. making a thermoset. Thermosets are generally more difficult to process than thermoplastics (U.S. Pat. No. 6,667,351).

Stress relaxation of molded or thermoformed parts can be differentiated from stress resulting from molding or machining. It is known that molding or machining polymers introduces stress, referred to as "molded-in" stress, where the article is, for example, more prone to cracking or crazing after machining. Such molded-in stresses can be removed by briefly heating the molded plastic parts (see, U.S. Pat. No. 5,324,473). Typically, the brief period of heating is conducted at a temperature that is above the glass transition temperature, but lower than the melt temperature or the decomposition temperature of the polymer. The presence or absence of internal stress in a polymer is readily ascertained by use of polarized light and is well known to those skilled in the art.

Elastomers are distinguished from other polymers by the criterion that most elastomers can be stretched at room temperature under a low stress and return to their original shapes after release of the stress. Many elastomers were developed either as cost competitive substitutes for vulcanized natural rubber or were formulated to meet a specific property requirement found lacking in natural rubber. Because most elastomers lend themselves to being compounded with many different materials, the choice of elastomer compounds available and the range of their uses is extensive. Products ranging from tires, to o-rings, to medical devices and children's toys, are formed from elastomers.

In designing articles from elastomers, compression set and tensile set are properties to consider. Compression set refers to the extent the elastomer is permanently deformed by a prolonged compressive load (ASTM D395). Tensile set refers to the extent the elastomer is permanently deformed after being stretched a specific amount for a short time, and is expressed as a percent of the original length or distance between gauge marks (ASTM D412). Failure of elastomeric articles exposed to a constant pressure or to repeated stretching and release, particularly when coupled with warm, humid environments, is a concern that must be considered when selecting a material for use in a given application.

U.S. Pat. No. 4,847,033 describes a process for decreasing the "free volume" of a polyethylene terephthalate (PET) film by first heating to a temperature below the glass transition (Tg), then tensioning the article, and then heating again below Tg. The heating process induces stress relaxation, i.e., induces a relaxation of the stresses in the polymer, and does not to prevent stress relaxation.

U.S. Pat. No. 4,900,502 discloses wet annealing below the glass transition temperature of microporous hollow fibers. The microporous fibers are formed of polysulfone, polyethersulfone, polyphenylsulfone, polyvinylidenefluoride, polyimide, or polyetherimide. The effects of heat treatment on microporous polymer articles does not relate to the effects of heat treatment on non-microporous polymer articles.

U.S. Pat. No. 6,171,758 describes annealing a semi-crystalline polymer by heating it to a temperature above the glass transition and below the melting point to improve dimensional stability.

U.S. Pat. No. 6,375,978 describes annealing of polymer membranes at temperatures 5-30° C. below the melting temperature of the polymer and above the glass transition temperature.

U.S. Pat. Nos. 4,816,342 and 4,770,944 describe wet annealing of ethylene vinyl alcohol co-polymers, polyvinyl alcohol, and nylon to increase crystallinity. The annealing is done at temperatures above the glass transition temperature.

The foregoing examples of the related art and limitations related therewith are intended to be illustrative and not exclusive. Other limitations of the related art will become apparent to those of skill in the art upon a reading of the specification and a study of the drawings.

SUMMARY

The following aspects and embodiments thereof described and illustrated below are meant to be exemplary and illustrative, not limiting in scope.

In one aspect, a method for improving the mechanical properties of polymer articles formed of a rigid, amorphous polymer is described.

In another aspect, a means to improve the dimensional stability of non-microporous and non-porous polymer articles formed of an elastomer or of a rigid, amorphous polymer is provided.

In one aspect, a method for reducing stress relaxation in a rigid, amorphous polymer article is provided. The method comprises determining a glass transition temperature of the polymer article; and heating the polymer article to a temperature that is between about 5° C. to about 25° C. lower than the glass transition temperature for a time sufficient to reduce stress relaxation.

In one embodiment, the method comprises determining a dry glass transition temperature of a polymer having a percent moisture uptake of less than about 0.4%. Heating of the polymer is then conducted in an environment having a relative humidity of less than 5%. This embodiment is particularly applicable to polycarbonate and polyester polymers.

In another embodiment, the method further comprises contacting the polymer article with an aqueous fluid at a temperature of at least about 20° C. for at least about 24 hours prior to determining the glass transition temperature. After the contacting, a wet glass transition temperature of the polymer article is measured. Preferably, in this embodiment, the heating is conducted at a relative humidity of greater than about 90%, alternatively at a relative humidity of less than about 50%.

In yet another embodiment, the method comprises heating the polymer under conditions where the polymer, after heating, remains substantially amorphous. That is, no appreciable amount of crystallinity is observed in the polymer, as measured by, for example x-ray diffraction or differential scanning calorimetry.

In another embodiment, the method further includes thermoforming, prior to said heating, the article into a desired geometry. Such thermoforming can be achieved using a rigid mold and where the article is heated while in contact with the mold for at least a portion of the heating time. The thermoformed article can be optionally cooled to ambient temperature or lower after thermoforming and prior to heating. The cooling step, in one embodiment, is for a period of at least 30 minutes.

In another embodiment, the method further comprises determining the percent moisture uptake of the polymer article. The heating is then conducted at a temperature that is from about [TgD−(5+(20*percent moisture uptake))] to about [TgD−(30+(20*percent moisture uptake))], where TgD is the dry glass transition temperature of the polymer article and the moisture uptake is a percent weight gain after 24 hours immersion in water at 20° C.+/−2° C.

In another embodiment, the method comprises determining a glass transition temperature of a polymer article having a percent moisture uptake of greater than about 0.4% and less than about 3% and heating the polymer to a temperature of between about 55-115° C. In another embodiment, the method comprises contacting the polymer article with an aqueous fluid at a temperature of at least about 20-25° C. for at least about 24 hours prior to said determining, and then heating the polymer to a temperature of between about 45-75° C. Preferred polymers for use in these embodiments are rigid thermoplastic polyurethanes.

In another embodiment, the method comprises determining the glass transition temperature of a polymer article and said heating comprises heating in a dry environment to a temperature of between about 75° C. to about 155° C. In yet another embodiment, the method includes contacting the polymer article with an aqueous fluid at a temperature of at least about 20° C. for at least about 24 hours prior to determining the glass transition, and then heating in a wet environment to a temperature of between about 65-145° C. Preferred polymer for use in these embodiments are polycarbonates and polyamides.

In yet another embodiment, the method further includes optionally cooling the polymer article, after heating, to a temperature of ambient temperature or below.

In the method, heating of the polymer is for between about 8-48 hours, in one embodiment.

In another aspect, the invention includes an article prepared according to the methods disclosed above, where the article is comprised of a polyurethane, a polyester, a polyamide, a polyimide, or a polyurea.

In another aspect, the invention includes an article prepared according to any one of the methods described above, wherein the polymer article is comprised of a polyurethane having less than 10% soft segments.

In another aspect, the invention includes a polymer article having reduced stress relaxation, the article comprised of a polymer having a percent moisture uptake of less than about 0.4%, and the article obtainable by heating the article to a temperature that is between about 5-25° C. lower than the dry glass transition temperature of the polymer for a time sufficient to achieve a reduction in stress relaxation by at least about 20% relative to the stress relaxation of the article prior to heating.

In one embodiment, the article has a glass transition temperature of between about 120-160° C. In yet another embodiment, the article is comprised of a polycarbonate.

In yet another aspect, the invention includes a polymer article having reduced stress relaxation, the article comprised of a polymer having a percent moisture uptake of equal to or greater than about 0.4% and equal to or less than about 3%, and the article obtainable by heating the article to a temperature that is between about 5-25° C. lower than the wet glass transition temperature of the polymer for a time sufficient to achieve a reduction in stress relaxation by at least about 20% relative to the stress relaxation of the article prior to heating.

In one embodiment, the article has a wet glass transition temperature of between about 65-120° C. Exemplary polymers are polyurethanes, polyamides, polyesters, polyimides, and polyureas. A preferred polyurethane is one having less than 10% soft segments. Another preferred polyurethane is comprised of greater than 90% the reaction product of 4,4'-diphenylmethane diisocyanate and 1,6 hexanediol.

In another aspect, the article is a polyurethane prepared from one or more diols selected from the group consisting of 1,4 butanediol, 1,6 hexanediol, propylene glycol, dipropylene glycol, and 1,4, cyclohexanedimethanol.

The article, in one embodiment, is a thermoformed article having a desired geometry. Exemplary articles are a medical devices, particularly devices intended to come into contact with moisture or bodily fluids, and including orthodontic devices.

These and other objects and features of the invention will be more fully appreciated when the following detailed description of the invention is read in conjunction with the accompanying drawings.

BRIEF DESCRIPTION OF THE DRAWINGS

(FIG. 4B), or heat treated at 80° C. (FIG. 4C);

DETAILED DESCRIPTION OF THE INVENTION

I. Definitions

Figure 1A:
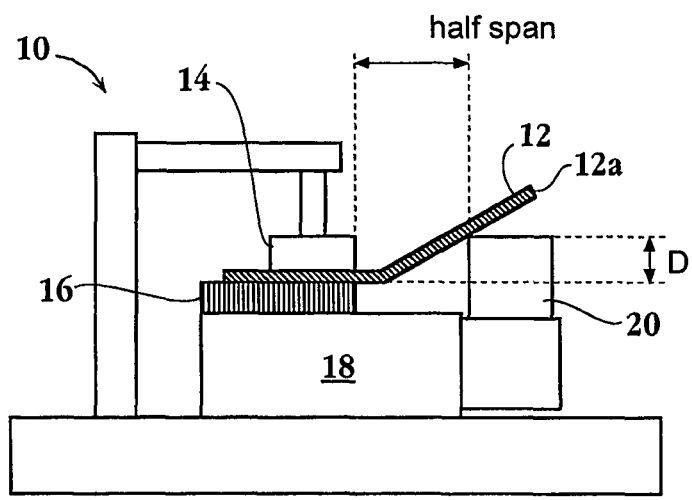
FIGS. 1A-1B show test apparatuses for measuring stress relaxation at constant temperature and relative humidity.

As used herein, the term "stress relaxation" refers to the percent loss of tension or load between the maximum load or force encountered after elongating an elastic material at a specified rate of extension to a predetermined length (or the load or force measured at some initial length) and the remaining load or force measured after the sample has been held at that length for a specified period of time, for example, from about 0 minutes to about 24 hours. Except where otherwise noted for the present invention, stress relaxation is expressed as a percentage loss of the initial load encountered at a specified extension. The stress relaxation is determined according to the method set forth in the methods section below. Alternative methods of determining stress relaxation are known in the art, such as testing on an Instron® Model 5565 Universal Test Machine using ASTM micro tensile specimens.

As used herein, the term "thermoplastic" refers to any material which can be melted and resolidified with little or no change in physical properties (assuming a minimum of oxidative degradation).

"Creep resistance" refers to dimensional stability of a material to irreversible deformation on prolonged action of an applied force at a given temperature.

A material which has good "dimensional stability" has a low stress relaxation and/or a high resistance to creep and therefore resists changes in shape during use. Elastomers with good "dimensional stability" have low compression set and/or low tensile set.

As used herein, the term "for a time sufficient to reduce stress relaxation" intends a period of time effective to produce a measurable improvement in stress relaxation, typically an improvement greater than or of at least about 10%, more preferably of greater than or of at least about 20%.

The phrase "percent moisture uptake" refers to the percent increase in sample weight, relative to initial weight, after 24 hours immersion in water at 20° C.+/−2° C., as further detailed in the Methods section below.

II. Method of Improving Stress Relaxation

In a first aspect, the invention provides a method for improving the mechanical properties of polymers, and in particular of elastomeric polymers and of rigid, amorphous polymers. A 'rigid' polymer refers to a polymer that has a glass transition temperature (Tg) of at least about 20° C., more preferably of at least about 30° C., still more preferably of at least about 40° C. The method is particularly suited for polymers that have an inherent water absorptivity (i.e., moisture uptake) of equal to or greater than about 0.3% and equal to or less than about 2.5% by weight of moisture at 25° C. and 100% relative humidity. The method, however, is also suitable for polymers that have an inherent percent moisture uptake of less than about 0.3% or of greater than about 2.5%, as will be illustrated below.

The method is comprised of determining a glass transition temperature of the polymer and then heating the polymer at a temperature that is below the determined glass transition temperature for a time sufficient to improve a desired mechanical property. In a preferred embodiment, the mechanical property of interest is stress relaxation, and the method is effective to reduce the stress relaxation of the polymer. The glass transition temperature that is determined can be a glass transition temperature for the polymer "as is", e.g., after storage at ambient conditions for 24 hours. This "as is" glass transition temperature is also referred to herein as a "dry" glass transition temperature (TgD). The glass transition temperature that is determined can also be a "wet" glass transition temperature (TgW) determined on a polymer sample that has been in contact with moisture, typically neat water in liquid or gas form, at about 25° C. or higher for at least about 6 hours, more preferably 10 hours, still more preferably 24 hours. The glass transition temperature, dry or wet, is easily determined experimentally using a differential scanning calorimeter, as described in the Methods section below. Alternatively, dry and wet glass transition temperatures can be determined from various reference books, the scientific literature, or from polymer manufacturers. Glass transition temperatures can also be estimated and/or calculated based on known techniques.

The polymer is heated to a temperature that is about 5-25° C. lower than the determined glass transition temperature. The polymer article is heated at the selected temperature for a time sufficient to achieve an improvement in a desired mechanical property, and in particular to achieve a reduction in the stress relaxation of the polymer article. As used herein the phrase "for a time sufficient to achieve an improvement in . . . " or "for a time sufficient to reduce stress relaxation" intends a time period that can be determined based on the guidance provided herein. Typically, the time period is from about 1 hour to 24 hours, however times of considerably longer than 24 hours may be needed in some situations. The optimal time period to improve a mechanical property, such as a reduction in stress relaxation, is readily determined by measuring the mechanical property as a function of time during heating at the selected temperature. When the mechanical property has improved a desired amount or when continued improvement with further time becomes de minimis, the time to improve the mechanical property is sufficient.

In the supporting studies described below, rigid amorphous polymers were selected to illustrate the beneficial effects achieved by the method. Various rigid, amorphous polymer articles were treated by heating below the wet or dry glass transition temperature for various times. The stress relaxation of the polymer articles were determined at 37° C. and at either 95% relative humidity or at 100% relative humidity. Tests at 95% relative humidity were determined using the apparatus shown in FIG. 1A and according to the procedure set forth in the Methods section below. Tests at 100% relative humidity (i.e., submerged in water) were determined using the apparatus shown in FIG. 1B and according to the procedure set forth in the Methods section below. Polyurethane was selected as representative of rigid, amorphous polymers and the examples below were conducted primarily on polyurethanes. However, it will be appreciated that the method is equally applicable to other rigid, amorphous polymers, such as polycarbonates, polyesters, and polyamides, polymethylmethacrylate (PMMA), as will be illustrated by the data below.

It will also be appreciated that the method can be used to improve the mechanical properties, such as compression set and/or tensile set, of elastomers, as illustrated in Example 12 discussed below.

Figure 2A:
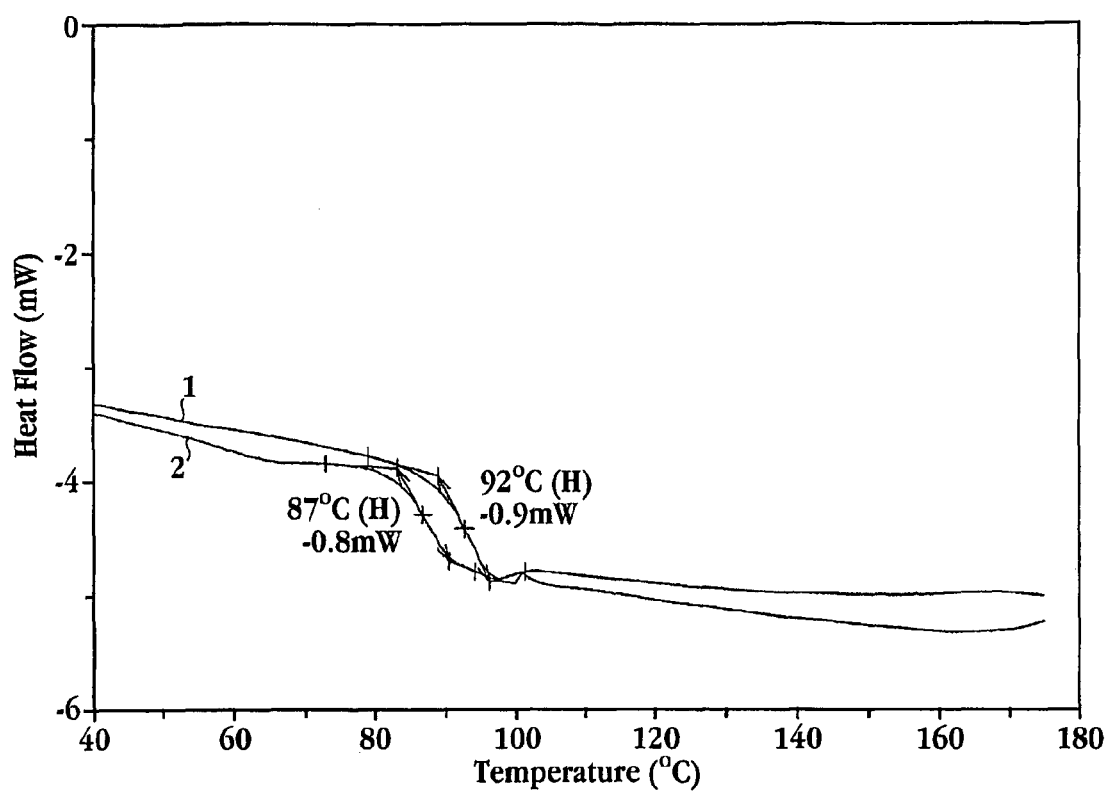
FIGS. 2A-2B are differential scanning calorimetry scans of the polyurethanes Isoplast® 2530 (FIG. 2A) and Estane® X-4995 (FIG. 2B) showing the glass transitions when the sample is subjected to a first heat and a second heat.
Figure 2B:
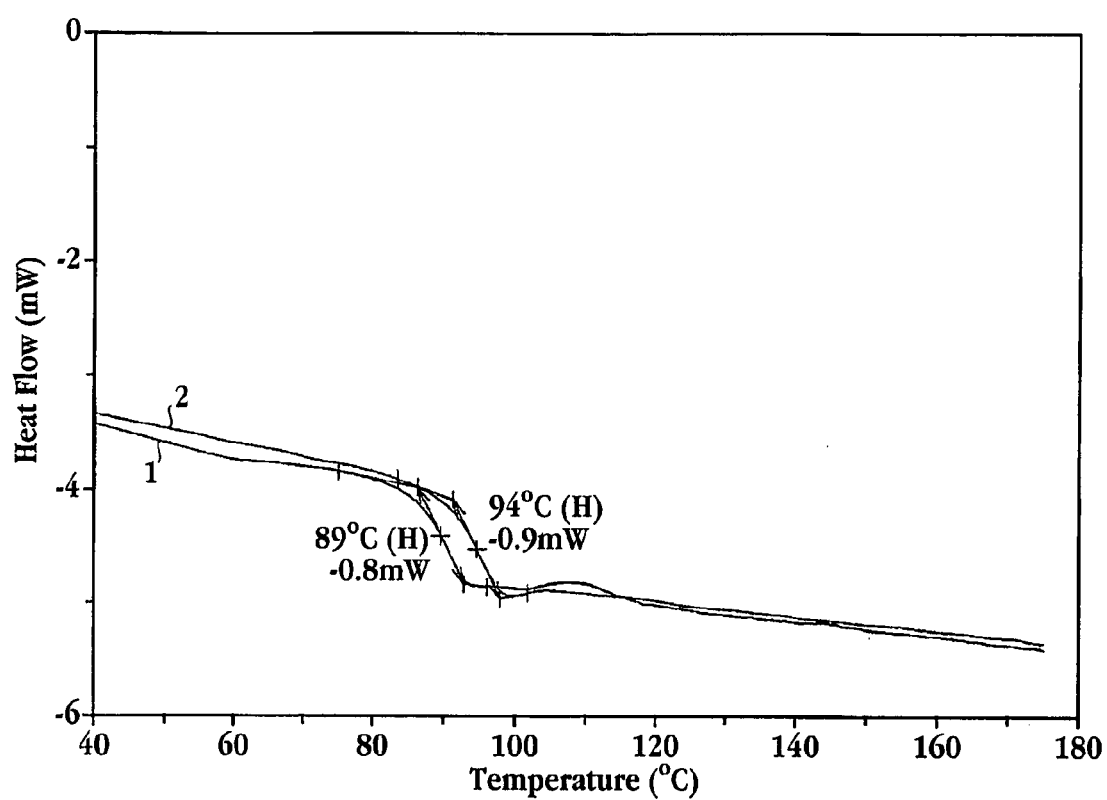

The polyurethanes designated by the trade names Isoplast® (Grades: 2530, 2531, 302EZ) and Estane® (Grades: X4995, X-1138, X-1172, X-1173, and X-1140) were selected for testing. Polymethylmethacrylate (PMMA, Trade Name Acrylic) was also tested. Articles for testing were prepared from extruded sheets, pressed pellets, or thick sheets pressed to 30 mils, as described in Example 1A The "as is" or "dry" glass transition temperatures of the polymers were determined by differential scanning calorimetry (DSC). Exemplary DSC scans for two polyurethanes are shown in FIGS. 2A-2B. The dry glass transitions corresponding to the midpoint of the transition of the second heat were 92° C. for Isoplast® 2530 (FIG. 2A) and 94° C. for Estane® X-4995 (FIG. 2B).

Figure 2C:
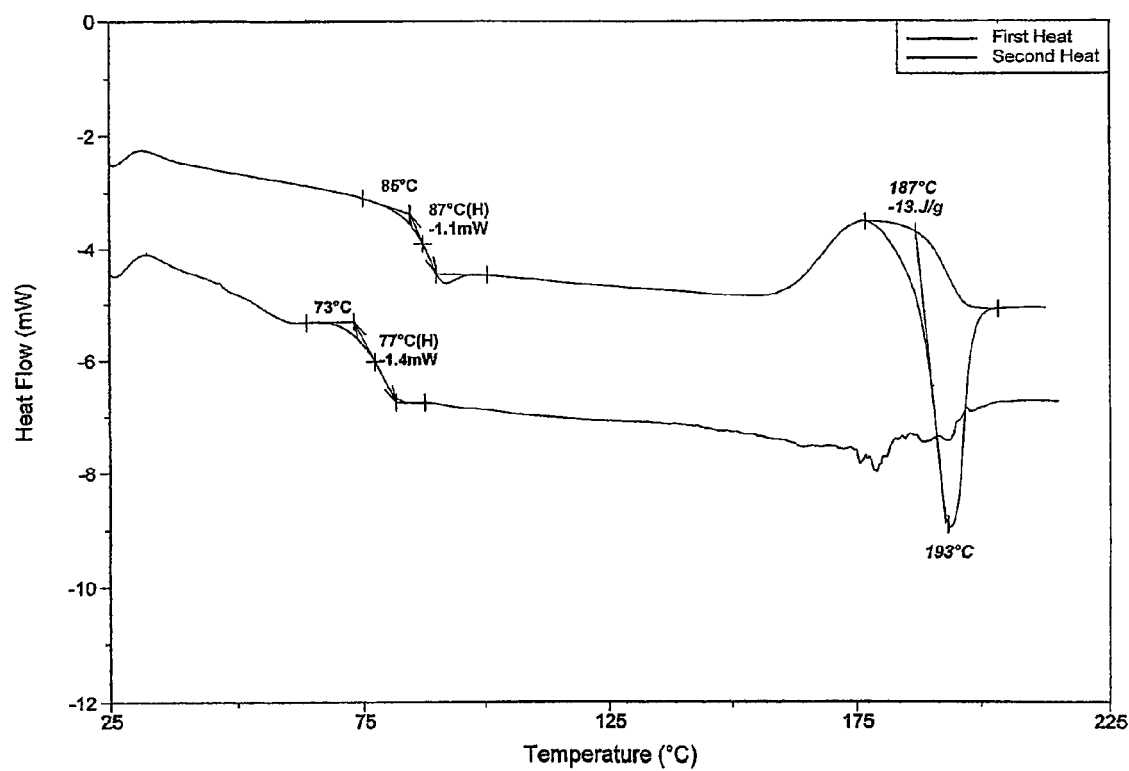
FIGS. 2C-2D are differential scanning calorimetry scans of the polyurethane polymers Isoplast® 2530 (FIG. 2C) and Estane® X-4995 (FIG. 2D) showing the "wet" glass transitions observed during the first heat scan of polymer samples that had been immersed for 24 hours in water.
Figure 2D:
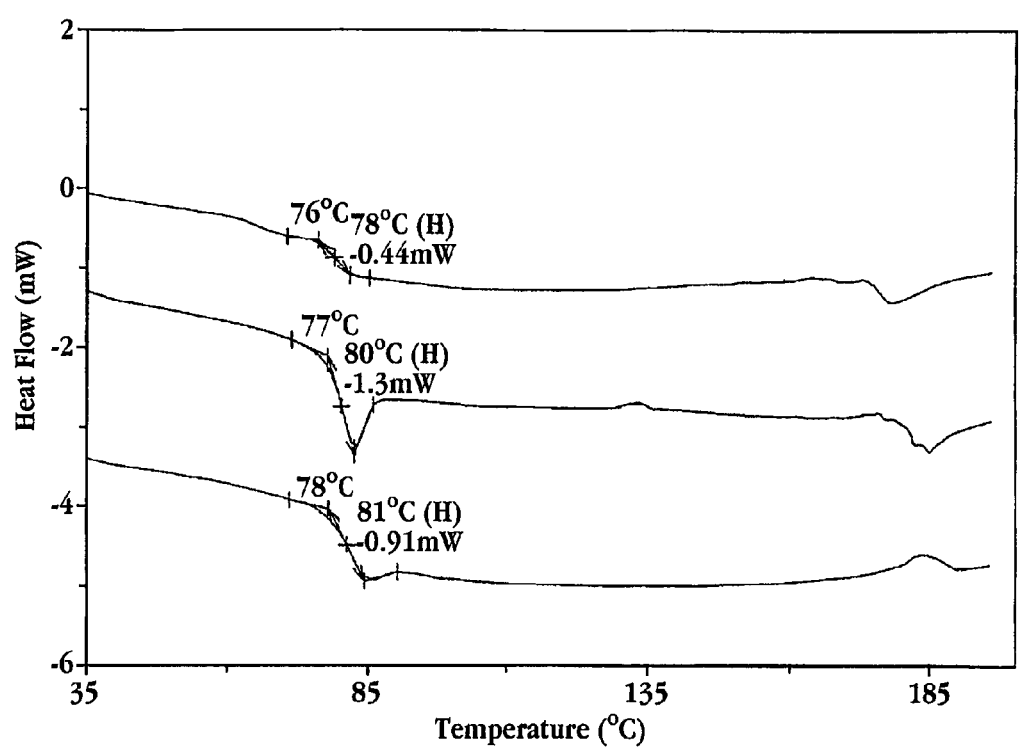

The wet glass transition temperatures of the polyurethanes was also determined, as described in Example 1B. A sample of each polymer was immersed in water at 37° C. for 24 hours and then tested by DSC. Exemplary DSC scans for two polyurethane articles are shown in FIGS. 2C-2D. The wet glass transitions corresponding to the midpoint of the transition of the first heat were 77° C. for Isoplast® 2530 (FIG. 2C) and 78-81° C. for Estane® X-4995 (FIG. 2D).

Samples of the extruded polyurethane sheets were subjected to various thermal conditions, and Example 2 describes the thermal conditions in detail. In brief, samples were left untreated (samples 1, 2) or were heated treated at 60° C. in a dry environment (sample 3), at 60° C. in a wet environment (sample 4), at 115° C. in a dry environment (samples 5, 6), and at 80° C. in a dry environment (sample 7). Stress relaxation of each sample was measured at 37° C. and 95% relative humidity with approximately 5% strain, and the results are shown in Table B (below in Example 2) and in FIG. 3.

Figure 3:
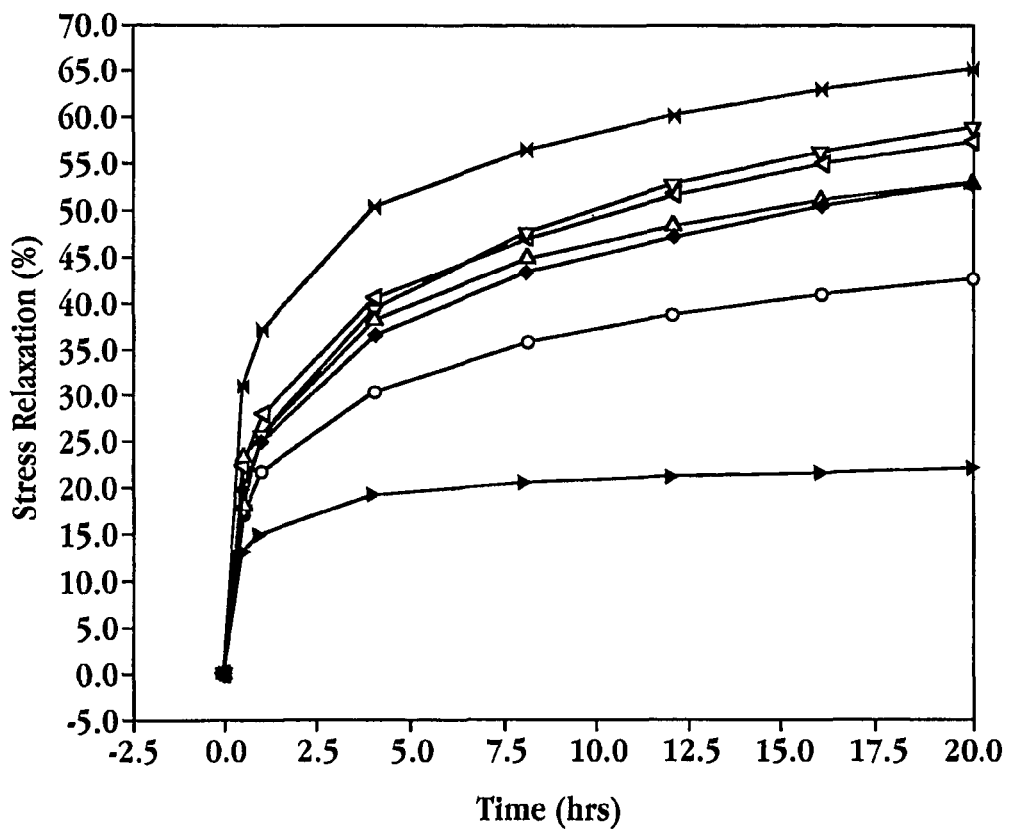
FIG. 3 is a plot of stress relaxation, in percent, as a function of time, in hours, for polyurethane samples left untreated (samples 1, 2; diamonds, inverted triangles) and heat treated at 60° C. in a dry environment (sample 3, triangles), at 60° C. in a wet environment (sample 4; right pointing arrow head); at 115° C. (samples 5, 6; left pointing arrow head; double arrow head); and at 80° C. (sample 7, circles)

FIG. 3 is a plot of stress relaxation, in percent, as a function of time, in hours, for the polyurethane samples. Samples left untreated (samples 1, 2; diamonds, inverted triangles) had a stress relaxation of greater than 50% at 20 hours. The samples heated above the glass transition (samples 5, 6; left pointing arrow head; double arrow head) also had stress relaxations of greater than 50% at 20 hours, in fact the stress relaxation of these samples after heating above the glass transition was higher than the untreated controls (diamonds, inverted triangles). Sample 3 (triangles), heat treated at 60° C. in a dry environment (i.e., 34° C. below its dry glass transition temperature), when compared to its control (sample 1, diamonds) showed no improvement in stress relaxation. Sample 7 (circles), heat treated at 80° C. in a dry environment (i.e., 14° C. below its dry glass transition temperature), when compared to its control (sample 1, diamonds) had a markedly improved stress relaxation, where the 20 hour stress relaxation of the heat treated sample was 44%, compared to 54% of the untreated control. Sample 4 (right pointing arrow heads) was treated at 60° C. (i.e., 18-21° C. below its wet glass transition temperature) in a wet environment (100% relative humidity) and the reduction is stress relaxation is apparent, where the 20 hour stress relaxation was 22%.

The study in Example 2 illustrates the reduction in stress relaxation achieved when polyurethane is heated at a temperature lower than the dry glass transition temperature of the polymer. Of note in the study are the results obtained with samples 3 and 4, where sample 3 was heated for 24 hours in a dry environment at a temperature that was 34° C. below the dry glass transition temperature of the polyurethane Estane® X-4995. This treatment method provided no reduction in stress relaxation. In contrast, sample 4 was heated for 24 hours in a wet environment at a temperature that was 18-21° C. below the wet glass transition temperature of the polyurethane Estane® X-4995 and a considerable reduction in stress relaxation was achieved. The method of the invention contemplates heating the polymer article in an environment having a relative humidity of greater than 90%, where the heating temperature is between 5-25° C. below the wet glass transition temperature. The method of the invention also contemplates heating the polymer article in an environment having a relative humidity of less than about 5%, where the heating temperature is between 5-25° C. below the dry glass transition temperature. It is apparent from the data obtained on sample 3 (FIG. 3, triangles) that heating in a dry environment at a temperature $T_1$ that is too far below the dry glass transition temperature, e.g., 34° C. below TgD, does not achieve a reduction in stress relaxation. However, that same heating temperature $T_1$ is a suitable temperature for heating a polymer sample in a wet environment, where the wet Tg of the sample is depressed relative to the dry glass transition due to the presence of water in the polymer.

Examples 3-7 illustrate the method wherein a polymer sample is heated at a temperature below its dry glass transition temperature in a dry environment, to obtain an improvement in polymer mechanical properties. A "dry" environment as used herein intends an environment that has less than at least about 50% relative humidity, more typically less than 10% relative humidity, more preferably a relative humidity of 5% or less. In the study detailed in Example 3, the polyurethane polymer Estane® X-4995, having a dry glass transition temperature of 94° C. (Example 1), was heated 80° C. for 24 hours at a relative humidity of about 2%. A second sample was heated at 80° C. for 24 hours and then cooled to −10° C. for 24 hours. Both samples were then tested for stress relaxation over a 24 hour period and compared to a control sample that had not been heat treated. The results are shown in Table 1.

TABLE 1

| Time hrs | Control, untreated | Heated at 80° C. for 24 hr | Heated at 80° C. for 24 hr; Cooled at −10° C. for 24 hrs |
|---|---|---|---|
| 0 | 0 | 0 | 0 |
| 0.1 | 17.23 | 12.87 | 12.76 |
| 0.5 | 26.42 | 21.40 | 20.70 |
| 1 | 30.91 | 25.31 | 25.05 |
| 4 | 41.87 | 35.34 | 34.60 |
| 8 | 48.17 | 40.77 | 40.59 |
| 12 | 51.88 | 44.43 | 43.86 |

TABLE 1-continued

| Time hrs | Control, untreated | Heated at 80° C. for 24 hr | Heated at 80° C. for 24 hr; Cooled at −10° C. for 24 hrs |
|---|---|---|---|
| 16 | 54.31 | 47.15 | 46.29 |
| 20 | 56.15 | 48.66 | 47.79 |
| 24 | 57.88 | 50.50 | 49.28 |

Table 1 shows that heat treating the polyurethane at a temperature 14° C. below its dry glass transition temperature and in a dry (i.e., a relative humidity of less than about 5%) environment was effective to reduce the stress relaxation by about 13% relative to an untreated control. The sample that was additionally cooled to −10° C. post annealing also had a reduction in stress relaxation relative to the untreated control sample. Accordingly, in another embodiment, the method includes an optional step of cooling the polymer article to ambient temperature or below after heating the polymer, more preferably optionally cooling the polymer article to between about −20° C. to 25° C.

In Example 4, samples of the polyurethanes Estane® X-4995 and Isoplast® 2530 were heated 12-14° C. below their dry glass transition temperatures for 67 hours. Stress relaxation of the samples was measured under a 5% strain. Prior to stress relaxation testing the samples were pre-conditioned by immersion in water at 37° C. for 24 hours. The stress relaxation testing was done at 37° C. at 95% relative humidity. As controls, additional samples were not heat treated or were heat treated at 90° C., 2-4° C. below the polymers' dry glass transition temperatures for 18 hours. The control samples were also pre-conditioned by immersion in water at 37° C. for 24 hours prior to stress relaxation testing under the same test conditions. The results are shown in FIGS. 4A-4C.

Figure 4A:
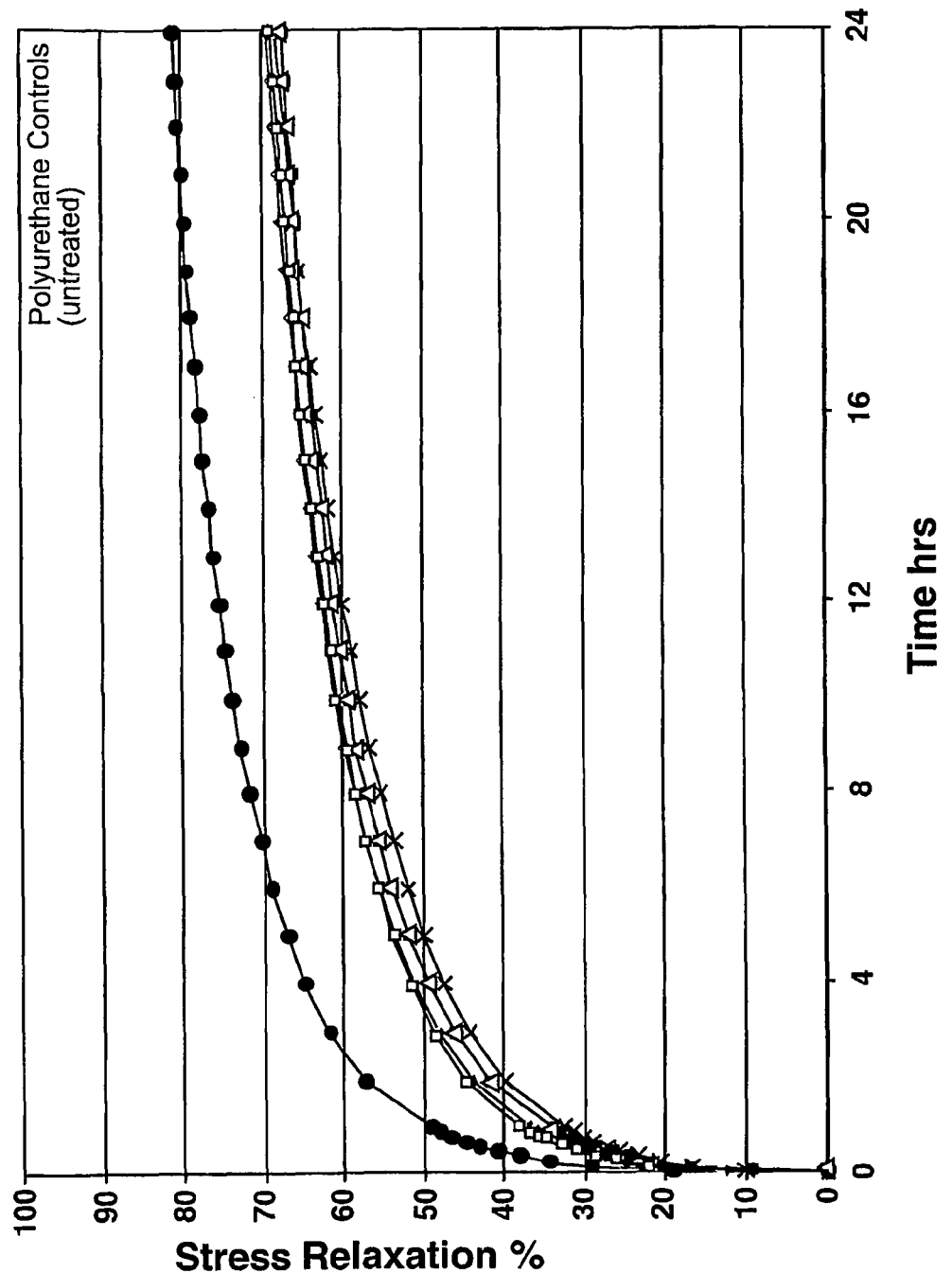
FIGS. 4A-4C are plots of stress relaxation, in percent, as a function of time, in hours, for polyurethane samples of Estane® X-4995 (4 samples, diamonds, triangles, squares, X symbols) and of Isoplast® 2530 (circles) left untreated (FIG. 4A), heat treated at 90° C.
Figure 4B:
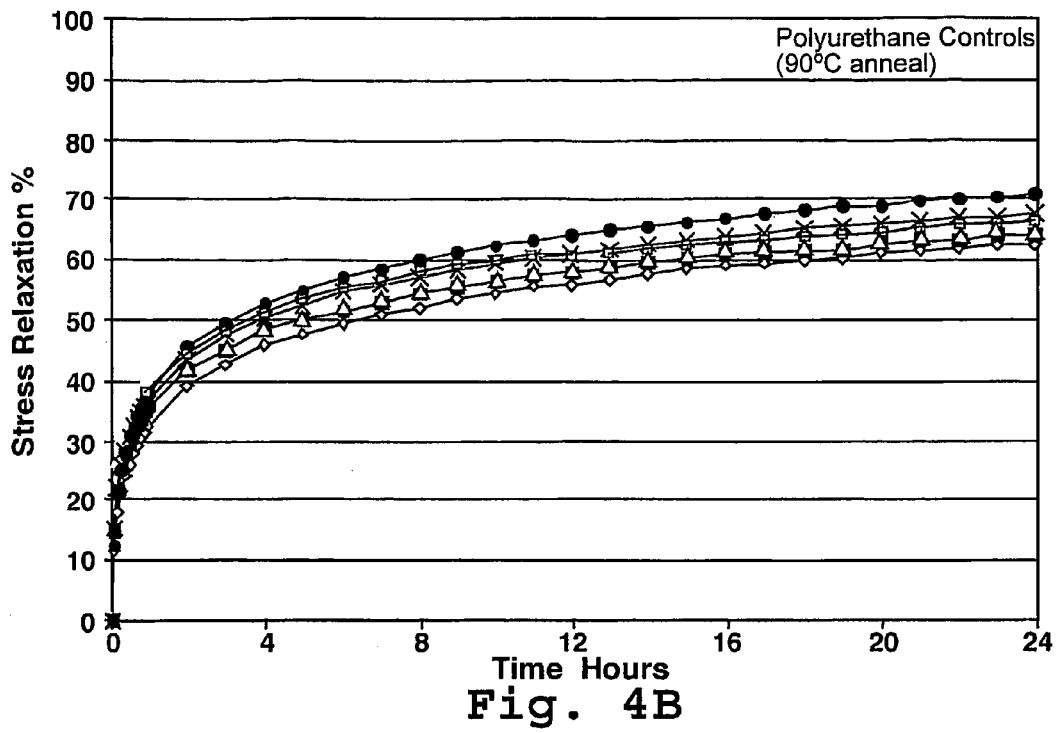

FIG. 4A shows the results for the control samples that were not subjected to a heat treatment. The stress relaxation of four samples of the polyurethane samples of Estane® X-4995 (represented by the diamond, triangle, square, and X symbols) and one sample of Isoplast® 2530 (circles) were tested. The stress relaxation of the polyurethane polymers at the 24 hour time point was 68% (Estane® X-4995) and 81% (Isoplast® 2530). FIG. 4B shows the data for the samples that were dried at 90° C. As seen, the stress relaxation of the polyurethane polymers at the 24 hour time point was 65% (Estane® X-4995) and 71% (Isoplast® 2530).

Figure 4C:
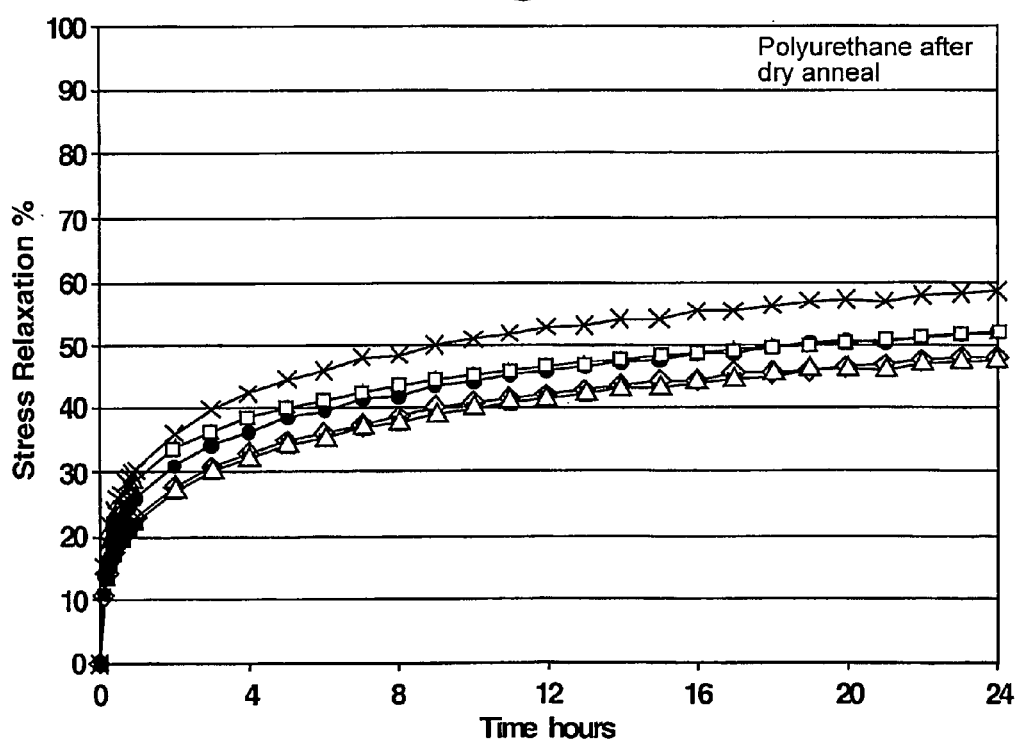

FIG. 4C presents the results for the samples treated by annealing at 80° C., 12-14° C. below the dry glass transition temperatures. The stress relaxation of the polymers was significantly reduced, as seen by the values at the 24 hour time points: 51% (Estane® X-4995) and 52% (Isoplast® 2530). Heat treating the polymers in a dry environment at a temperature of at least about 5° C. below the dry glass transition was effective to reduce the stress relaxation by at least about 25%.

Figure 4D:
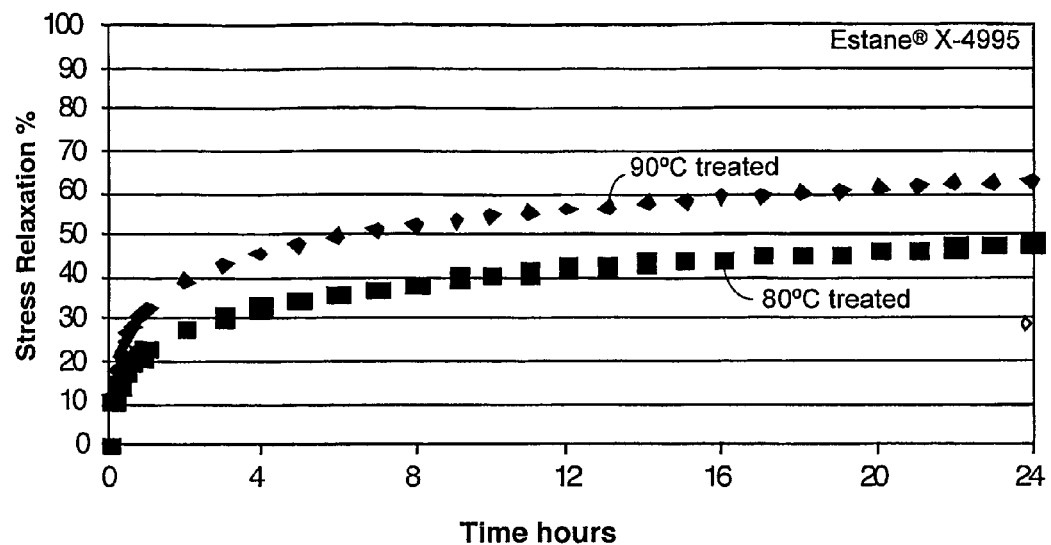
FIGS. 4D-4E are plots of stress relaxation, in percent, as a function of time, in hours, for polyurethane samples of Estane® X-4995 (FIG. 4D) and of Isoplast® 2530 (FIG. 4E) after 80° C. heat treating (squares) and after 90° C. heating (diamonds)
Figure 4E:
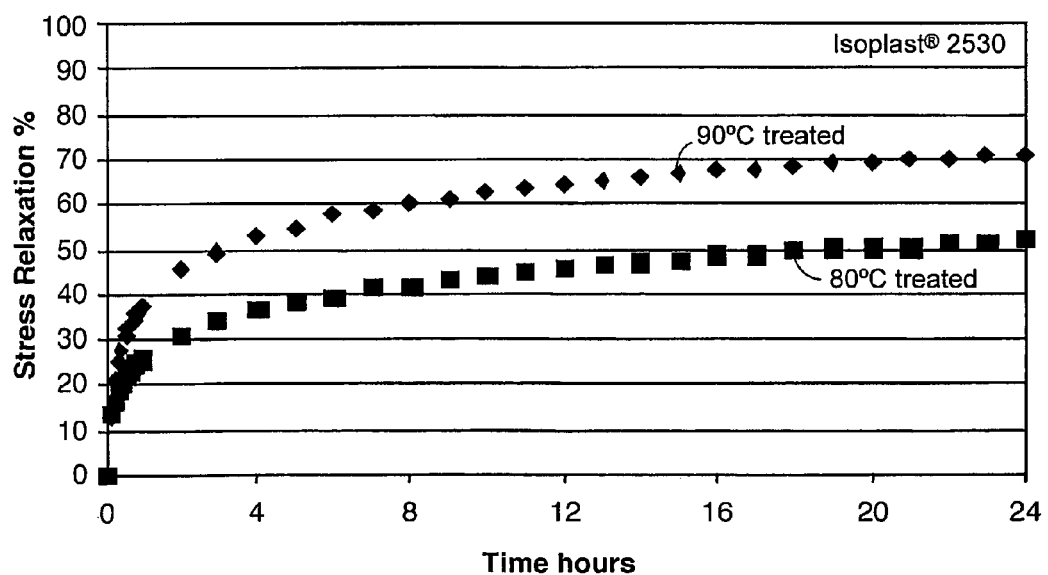

This study illustrates the effectiveness of the method to improve mechanical properties by heat treating in a dry environment at a temperature of at least about 5° C. below the dry glass transition. This is seen by comparing the stress relaxation properties of the samples heat treated by annealing at 80° C. for 67 hours (12-14° C. below TgD) with the samples heat treated by drying at 90° C. (24° C. below TgD). This particular stress relaxation data for the polyurethanes Estane® X-4995 and Isoplast® 2530 is shown graphically in FIGS. 4D-4E. As seen in FIG. 4D, the stress relaxation of polyurethane (Estane® X-4995) annealed at 80° C. (squares) is lower at all time points than the polymer treated at 90° C. (diamonds). FIG. 4E shows the same result for the polyurethane Isoplast® 2530, where the stress relaxation of the samples subjected to heat treatment at 80° C. (squares) is considerably lower than the samples treated at 90° C. (diamonds).

Figure 5:
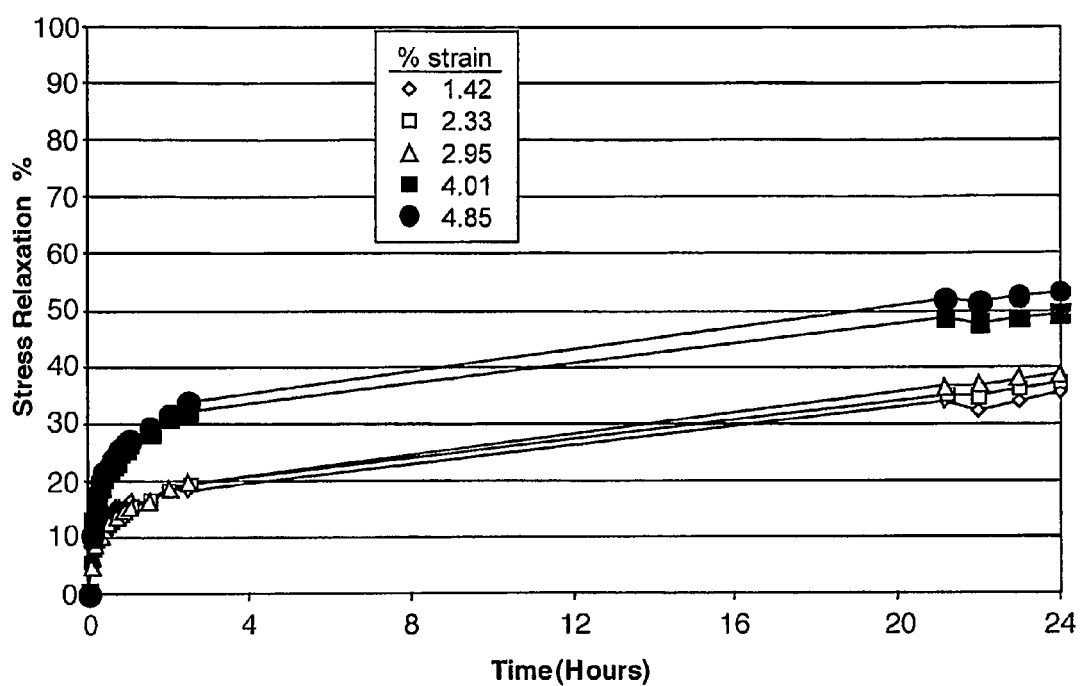
FIG. 5 is a plot of stress relaxation, in percent, as a function of time, in hours, for the polyurethane Estane® X-4995 after heat treatment at 80° C. for 64 hours, the stress relaxation measured at 1.4% strain (diamonds), 2.3% strain (open squares), 2.9% strain (triangles), 4.0% strain (closed squares), and 4.8% strain (circles)

In another study, samples of polyurethane were treated by annealing at 80° C. for 64 hours. The heat-treated samples were tested for stress relaxation, as described in Example 5, at strain rates varying between 1-5%. The results are shown in FIG. 5, where the stress relaxation measured at 1.4% strain (diamonds), 2.3% strain (open squares), 2.9% strain (triangles), 4.0% strain (closed squares), and 4.8% strain (circles) as a function of time is shown. The data in FIG. 5 suggests a low level of stress relaxation at strain rates between 0-3% and a higher level of stress relaxation at strain rates of 3-5%. In either case, the stress relaxation at the 24 hour time point is considerably improved relative to samples not heat treated (see, FIG. 4A). That is, unmodified polyurethane has a stress relaxation at the 24 hour time point of about 68% (5% strain); after heat treatment the stress relaxation was 35% at 1.4% strain, 37% at 2.3% strain, 38% at 2.9% strain, 49% at 4.0% strain, and 53% at 4.8% strain. This represents a 22% reduction in stress relaxation at the 5% strain rate.

The reduction in stress relaxation achieved by the heat treatment is retained by the polymer, as illustrated in the study detailed in Example 6. In brief, polyurethane polymer articles were heated at 80° C. for 96 hours. Stress relaxation of the samples was measured immediately after the 96 hour heating period, and at 5, 14, and 28 days after the heating period. The results are shown in FIG. 6.

Figure 6:
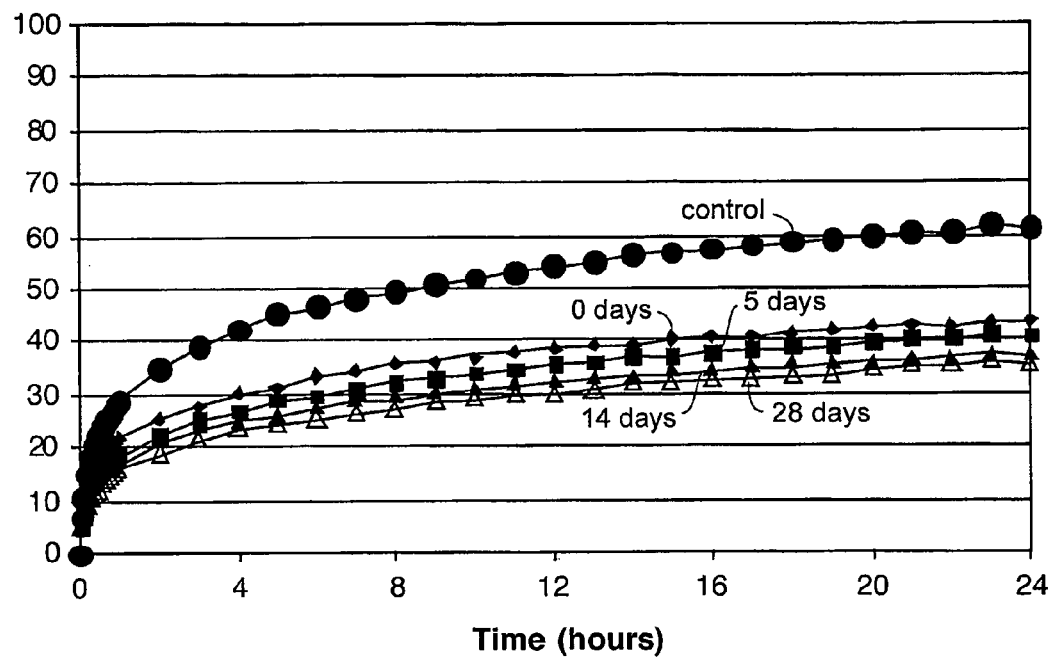
FIG. 6 is a plot of stress relaxation, in percent, as a function of time, in hours, for the polyurethane Estane® X-4995 with no heat treatment (open circles) and after heat treatment at 80° C. for 96 hours, where stress relaxation was measured immediately post-heat treatment (diamonds) and 5 days (squares), 14 days (closed triangles) and 28 days (open triangles) post-heat treatment.

FIG. 6 shows the stress relaxation for a control sample of polyurethane not subjected to heat treatment (circles), where the stress relaxation at 24 hours was about 62%. The polyurethane sample treated at 80° C. for 96 hours had a stress relaxation at 24 hours of 44% (diamonds). The stress relaxation of the polymer continued to reduce after the heat treatment, as seen by the stress relaxation of the sample at 5 days post-heating (squares) of 41%. At 14 days and 28 days post heating (closed and open triangles, respectively), the stress relaxation was 38% and 36%, respectively.

In another embodiment, the method is conducted on polymer articles that have been thermoformed into a desired geometry. In particular, a thermoformed article is fabricated from a polymer sheet via pressure and/or vacuum thermoforming using a rigid mold. In various studies, a mold prepared from an impression of a human mouth was used to fabricate an orthodontic device from the polymer sheet. The orthodontic device was then subjected to the heat treatment method described herein to achieve improvement in the article's mechanical properties, as evidenced by a reduction in stress relaxation. These studies will now be described.

Figure 7:
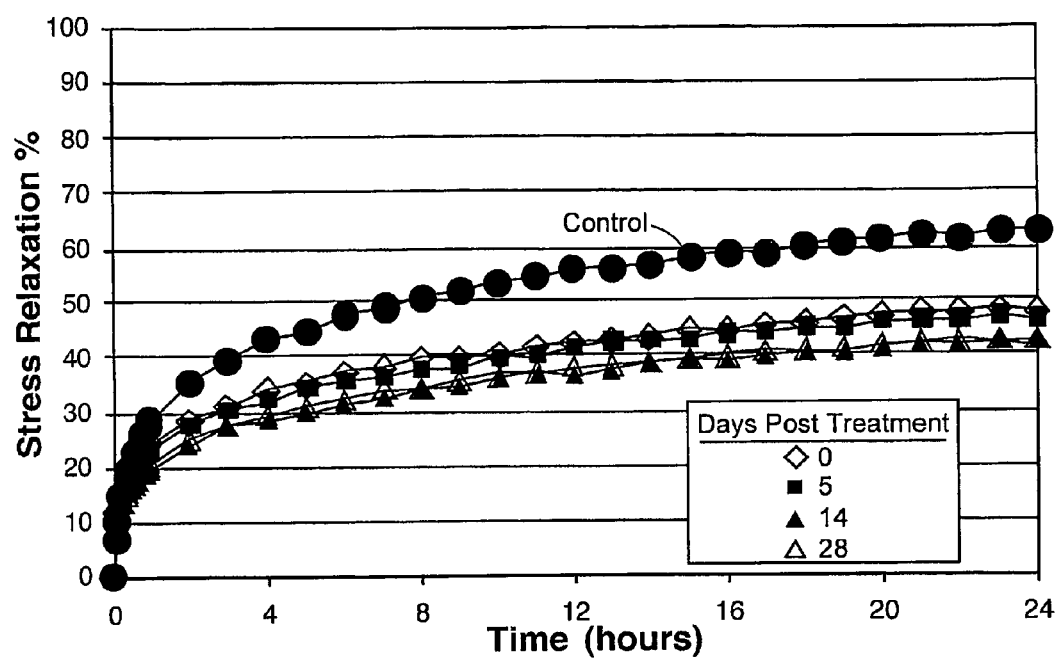
FIG. 7 is a plot of stress relaxation, in percent, as a function of time, in hours, for articles thermoformed from the polyurethane Estane® X-4995, where after thermoforming the article received no heat treatment (open circles) or was subjected to heat treatment at 80° C. for 96 hours, where stress relaxation was measured immediately post-heat treatment (diamonds) and 5 days (squares), 14 days (closed triangles) and 28 days (open triangles) post-heat treatment.

Polyurethane films of Estane® X-4995 0.76 mm thick were thermoformed into an orthodontic appliance as described in Example 7. After thermoforming, the articles were heated at 80° C. for 96 hours in a dry environment. After the 96 hour heat treatment period, stress relaxation was measured as a function of time. The results are shown in FIG. 7. The stress relaxation of the orthodontic appliance not subjected to heat treatment (control, circles) was about 63% at the 24 hour time point. The thermoformed article subjected to heat treatment at 80° C. for 96 hours had a stress relaxation immediately after heat treatment of 48% (diamonds). The stress relaxation of the articles continued to reduce after the heat treatment, as seen by the stress relaxation of the article at 5 days post-heating (squares) of 47%. At 14 days and 28 days post heating (closed and open triangles, respectively), the stress relaxation was 42% and 43%, respectively.

Various studies performed in support of the invention have indicated that the heat treatment can be conducted with the thermoformed article in place on the mold or with the thermoformed article removed from the mold. The improvement in stress relaxation was observed for articles heated in a dry environment at least 5° C. below the polymer's dry glass transition while in place on the mold for all or part of the heat treatment period.

In another embodiment, the invention provides a method to improve the mechanical properties of a polymer, and in particular a rigid, amorphous polymer, by heat treating the polymer in a wet environment at a temperature that is 5-25° C. lower than the wet glass transition temperature of the polymer. As used herein, "wet" environment refers to an environment having a relative humidity of greater than about 90%, more typically of greater than about 95%. In studies described herein, the wet environment was achieved by placing the polymer articles in liquid water for the specified period of time at the specified temperature. This embodiment of the invention was illustrated in Example 1 above with sample no. 4, and will be further discussed in Examples 8-10 below.

Figure 8A:
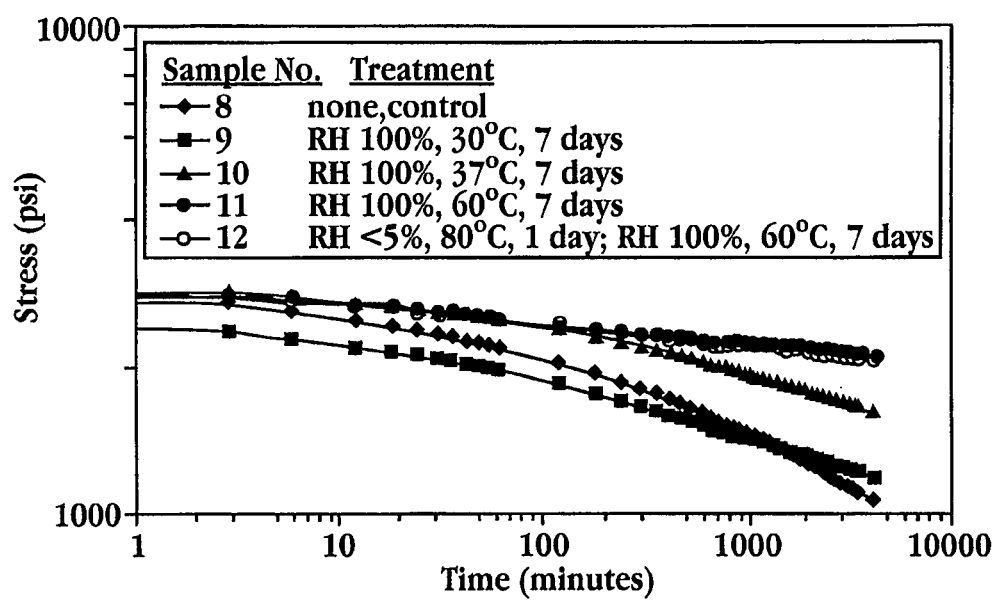
FIG. 8A is a plot of stress, in psi, as a function of time, in minutes, for polyurethane samples after heat treatment in a wet environment at 30° C. (squares), 37° C. (triangles), 60° C. (closed circles), after treatment in a dry environment at 80° C. followed by 60° C. in a wet environment (open circles), and for an untreated control (diamonds)
Figure 8B:
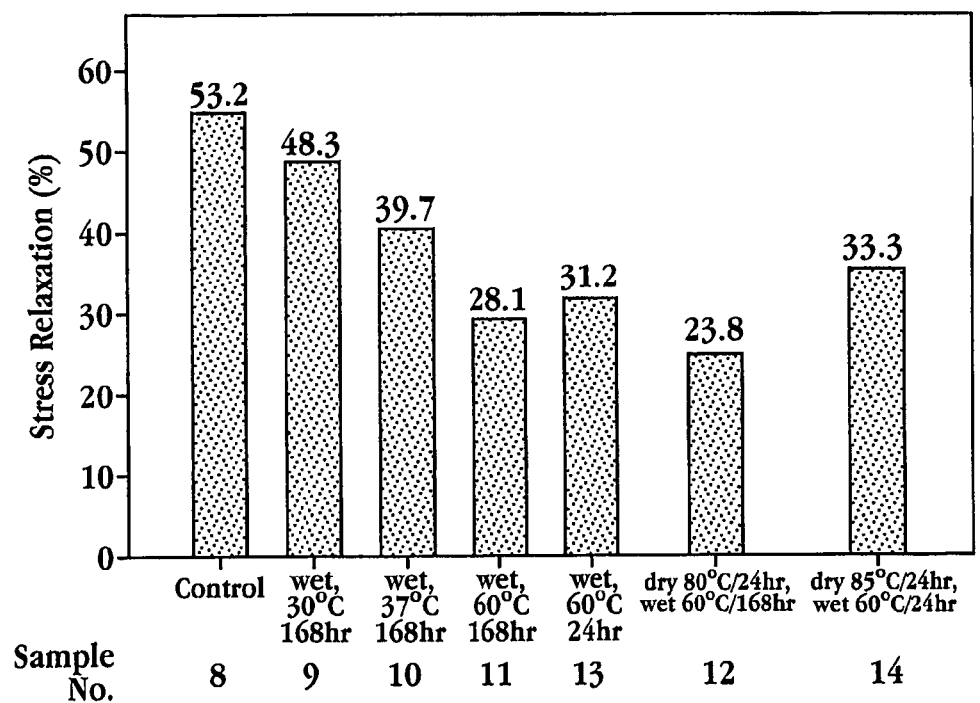
FIG. 8B shows the stress relaxation, in percent, at the 24 hour time point, for the polyurethane polymer samples treated as indicated along the x-axis.

Example 8 describes a study where samples of polyurethane were heated in a wet environment for 7 days at temperatures of 30° C., 37° C., and 60° C. (sample nos. 9, 10, 11, respectively). Another sample, identified as sample no. 13, was heated in a wet environment at 60° C. for 24 hours. Two additional polyurethane samples (sample nos. 12, 14) were heat treated in a dry environment for 24 hours at either 80° C. (sample 12) or 85° C. (sample 14) followed by heating in a wet environment at 60° C. for 7 days (sample 12) or for 24 hours (sample 14). Following the heat treatment, the stress relaxation was measured at 37° C., 95% relative humidity, and 5% strain. The stress, in psi, as a function of time, in minutes, is shown in FIG. 8A. Samples 11 and 12 (closed and open circles, respectively) have considerably different behavior than the control, (sample no. 8, diamonds) and than samples 9 and 10 treated at 30° C. (squares) and at 37° C. (triangles), respectively. The polymers treated at 60° C., which is about 18-21° C. lower than the wet glass transition temperature of polyurethane, provide a higher stress force, indicative of a reduction in stress relaxation. FIG. 8B shows the percent stress relaxation, calculated from the 24 hour time measurement, for the samples. Samples 11-14 were all heated in a wet environment at a temperature of 18-21° C. below the wet glass transition temperature, and a marked reduction in stress relaxation was achieved. Samples 12 and 14 were heated in a dry environment prior to heating in a wet environment, and the reduced stress relaxation is apparent.

Figure 9:
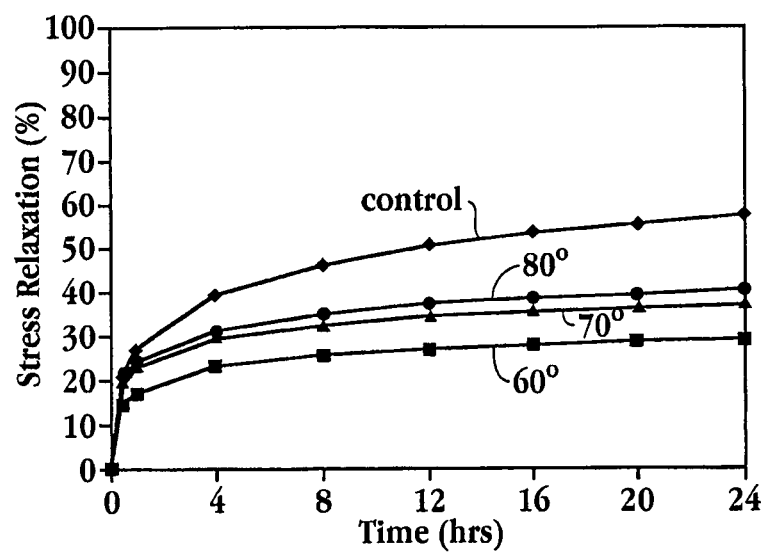
FIG. 9 is a plot of stress relaxation, in percent, as a function of time, in hours, for polyurethane samples of Estane® X4995 left untreated (diamonds) and after heat treating in a wet environment for 24 hours at 60° C. (squares), 70° C. (triangles), and 80° C. (circles)

Wet-annealing of polyurethane was further studied in the study described in Example 9. Briefly, samples of polyurethane were heated for 24 hours in a wet environment, i.e., by placing the samples is sealed plastic bags containing excess liquid water. Samples were heat treated in the wet environment at 60° C., 70° C., or 80° C. for 24 hours. After the wet heat treatment, stress relaxation was measured and the results are shown in FIG. 9. Polyurethane articles not treated by the wet heating (control, diamonds) had a stress relaxation of about 58% at 24 hours. The sample heated for 24 hours at 60° C. (squares), which is 18-21° C. below the wet Tg of polyurethane (Estane® X-4995) was 29% at 24 hours. This reduction in stress relaxation represents a 50% improvement in the stress relaxation, relative to the stress relaxation of the untreated control articles. The samples annealed in a wet environment at 70° C. (triangles), and 80° C. (circles) had stress relaxations of 38% and 41% respectively. These reductions represent improvements of 34% and 29% in the stress relaxation, respectively, relative to the control articles not subjected to heat treatment.

Another study was conducted to examine the improved mechanical properties in polyurethane and polymethylmethacrylate (PMMA) articles treated by wet-annealing. In this study, samples of the polymer articles were dry-annealed or wet-annealed at about 15-20° C. below the measured TgD or TgW for that polymer for 24 hours. Specifically, articles comprised of the polyurethanes Estane® (TgD 98° C.) and Isoplast® X-2531 were wet-annealed at 65° C.; articles comprised of PMMA were wet-annealed at 75° C.; and articles comprised of the polyurethanes Isoplast® 302EZ (TgD 135° C.), Estane® X-1138 (TgD 110° C.), Estane® X-1172 (TgD 114° C.), Estane® X-1173 (TgD 128° C.), Estane® X-1140 (TgD 121° C.) were wet-annealed at 80° C. Dry-annealing of articles comprised of the polyurethane Isoplast® X-2531 was done at 80° C. for 48 hours. Dry-annealing of articles composed of PMMA was done at 85° C. for 48 hours. Example 10 describes the annealing procedures.

Stress relaxation of each polymer article or sample was measured at 37° C. and either 95% relative humidity, 100% relative humidity, or both, with approximately 5% strain, as detailed in the methods section below.

Stress Relaxation Measured at 37° C. and 95% Relative Humidity

The stress relaxation tests performed at 37° C. and 95% relative humidity are summarized in Table G, presented in Example 10 below. FIGS. 10, 11, and 12A-12C, discussed below, present the data graphically.

Figures 10, 11:
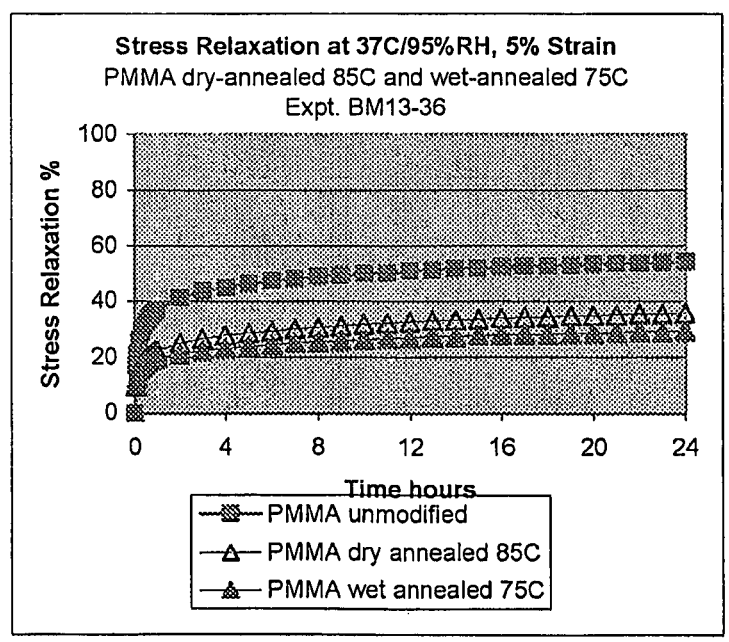
FIG. 10 is a plot of stress relaxation, in percent, as a function of time, in hours, for polyurethane samples of untreated Estane® X-4995 (solid squares); of untreated Isoplast® 2530 (diamonds); and of Isoplast® 2531 untreated (triangles), dry-annealed (squares), and wet annealed (circles)
FIG. 11 is a plot of stress relaxation, in percent, as a function of time, in hours, for polymethylmethacrylate unmodified (squares), dry-annealed (open triangles), and wet annealed (closed triangles)

FIG. 10 is a plot of stress relaxation, in percent, as a function of time, in hours, for polyurethane samples of Isoplast® 2530 untreated (diamonds); Isoplast® 2531 untreated (triangles), dry-annealed (squares), and wet annealed (circles). Untreated polymer articles comprised of the polyurethane Isoplast® 2531 has a stress relaxation of 51% at 24 hours. Dry-annealing improves the stress relaxation by decreasing the percentage of stress relaxation at 24 hours to about 38%. Wet-annealing a polymer article comprised of the polyurethane Isoplast® 2531 decreases the 24 hours stress relaxation to about 18%. Untreated articles comprised of the polyurethane Isoplast® 2530 exhibited a stress relaxation comparable to articles comprised of the polyurethane Isoplast® 2531 or of Estane® X-4995. Dry-annealing or wet-annealing of articles comprised of the polyurethane Isoplast® 2531 significantly improves stress relaxation performance relative to the results observed from dry or wet annealing of articles comprised of the polyurethane Isoplast® 2530 or of Estane® X-4995. While not intending to be bound by theory, this result may be due to the higher glass transition temperature of the polyurethane Isoplast® 2531 (109° C.) compared to the polyurethanes Isoplast® 2530 (93° C.) or of Estane® X-4995 (95-100° C.).

Polymethylmethacrylate (PMMA) is another rigid amorphous polymer exhibiting significant improvements in stress relaxation performance after dry or wet annealing. FIG. 11 is a plot of stress relaxation, in percent, as a function of time, in hours, for untreated PMMA (squares), dry-annealed (open triangles), and wet annealed (closed triangles). Dry-annealing and wet-annealing resulted in 34% and 46% reduction in stress relaxation at 24 hours.

Figure 12A:
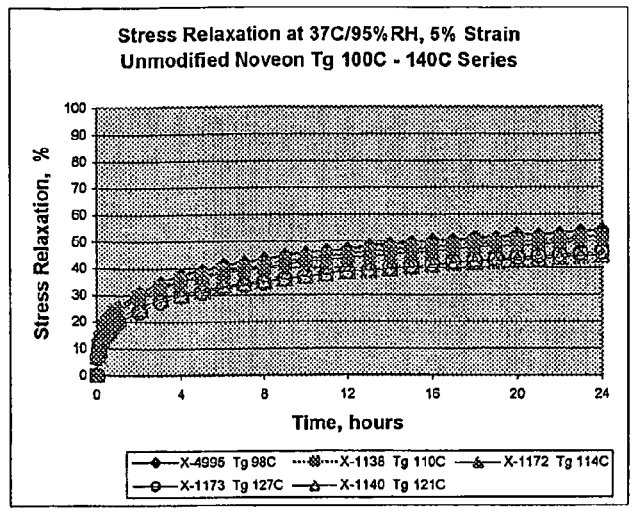
FIG. 12A is a plot of stress relaxation, in percent, as a function of time, in hours, for untreated polyurethane (Estane®) samples having measured Tg values of 98° C. (diamonds), 110° C. (squares), 114° C. (closed triangles), 121° C. (open triangles), and 127° C. (circles)
Figure 12B:
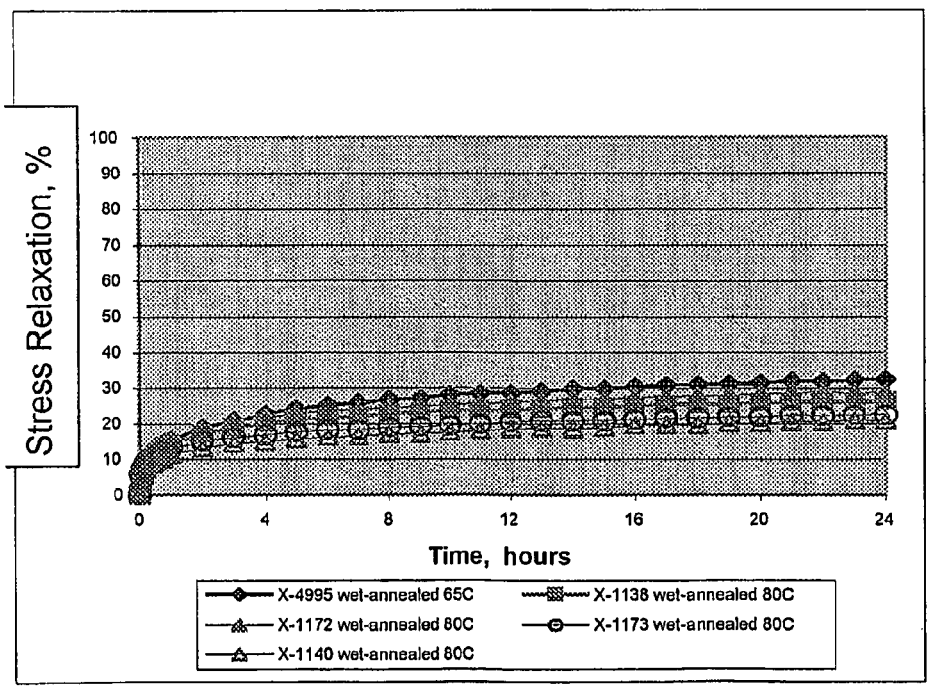
FIG. 12B is a plot of stress relaxation, in percent, as a function of time, in hours, for wet-annealed polyurethane (Estane®) samples, the stress-relaxation measured at 95% relative humidity and 37° C., the polyurethane samples having measured Tg values of 98° C. (diamonds), 110° C. (squares), 114° C. (closed triangles), 121° C. (open triangles), and 127° C. (circles)
Figure 12C:
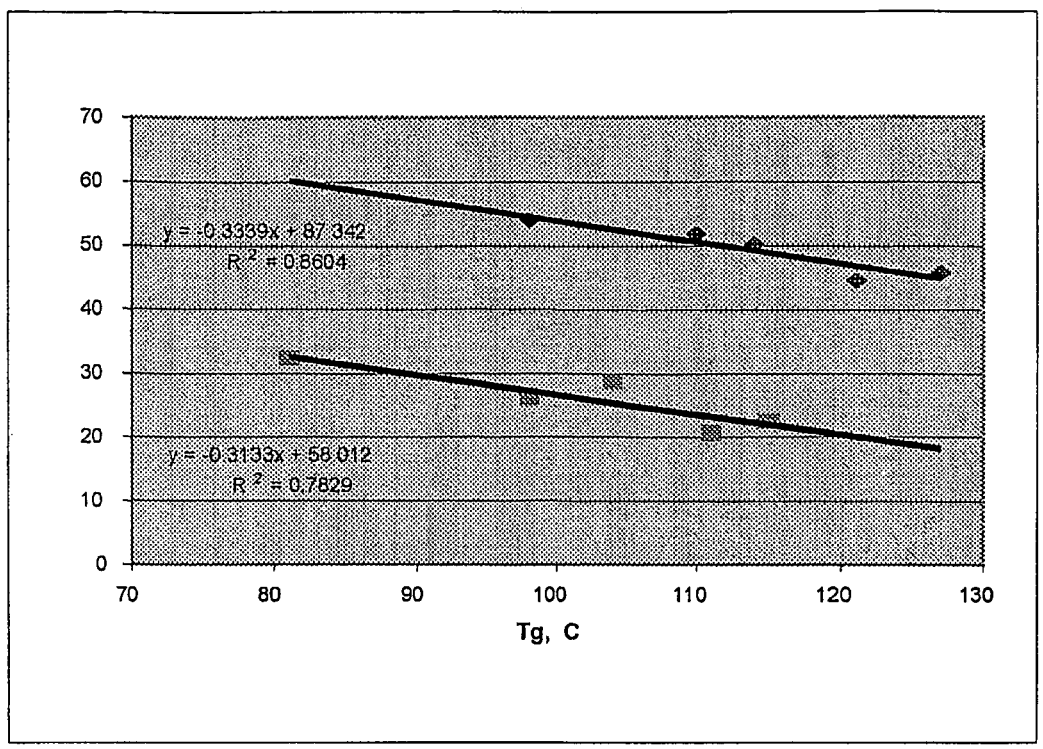
FIG. 12C shows the stress relaxation results of FIGS. 5A-5B plotted against the Tg of the polyurethane, where the percent stress relaxation for untreated polyurethane is plotted against the TgD (diamonds), and the percent stress relaxation for wet-annealed polyurethane plotted against the TgW (squares)

The stress relaxation results for the thermoplastic polyurethanes having measured Tg values of about 98-130° C. are shown in FIGS. 12A-12C, where FIG. 12A shows the results for untreated materials and FIG. 12B after wet-annealing. In FIG. 12A, the stress relaxation, in percent, as a function of time, in hours, for untreated polyurethane (Estane®) samples having measured Tg values of 98° C. (Estane® X-4995, diamonds), 110° C. (Estane® X-1138, squares), 114° C. (Estane® X-1172, closed triangles), 121° C. (Estane® X-1173, open triangles), and 127° C. (Estane® X-1140, circles) is shown. The 24 hour stress relaxation results ranged between 54% and 44.6%.

The stress relaxation results for the polymer articles after wet-annealing are shown in FIG. 12B, with the symbols the same as in FIG. 12A. The 24 hour stress relaxation results ranged between 32.4% and 20.7%. The improved stress relaxation achieved by wet-annealing is evident when compared to the data in FIG. 12A.

FIG. 12C shows the stress relaxation results of FIGS. 12A-12B plotted against the Tg of the polyurethane, where the percent stress relaxation for untreated polyurethane is plotted against the TgD (diamonds), and the percent stress relaxation for wet-annealed polyurethane plotted against the TgW (squares). The plot reveals an inverse trend between stress relaxation and glass transition. More specifically, stress relaxation of untreated thermoplastic polyurethane articles varies inversely with TgD. A linear fit of the data gives a coefficient of correlation ($R^2$) value of 0.86. Similarly, the stress relaxation of wet-annealed polymer articles correlates with TgW. A linear fit through the wet-annealed data points gives a coefficient of correlation ($R^2$) value of 0.78. These correlations also demonstrate the parallel or equivalent stress relaxation performance improvement of wet-annealed parts over the untreated polymer articles at a given glass transition. It will be appreciated that this correlation can be used as a predictive tool for stress relaxation performance of rigid polyurethanes. It will also be appreciated that such a correlation can be constructed, based on the methods described herein, for other polymers.

Stress Relaxation Measured at 37° C. and 100% Relative Humidity

This section presents the stress relaxation results conducted at 100% humidity (i.e., submerged in water). Tests were conducted on the treated polymer articles (wet-annealed or dry-annealed) at an approximately equal strain rate by varying the applied maximum load. The load was pre-determined on a sacrificial sample tested at various loads. The load rate was adjusted to ensure that the initial holding load was delivered within five seconds.

Figure 13:
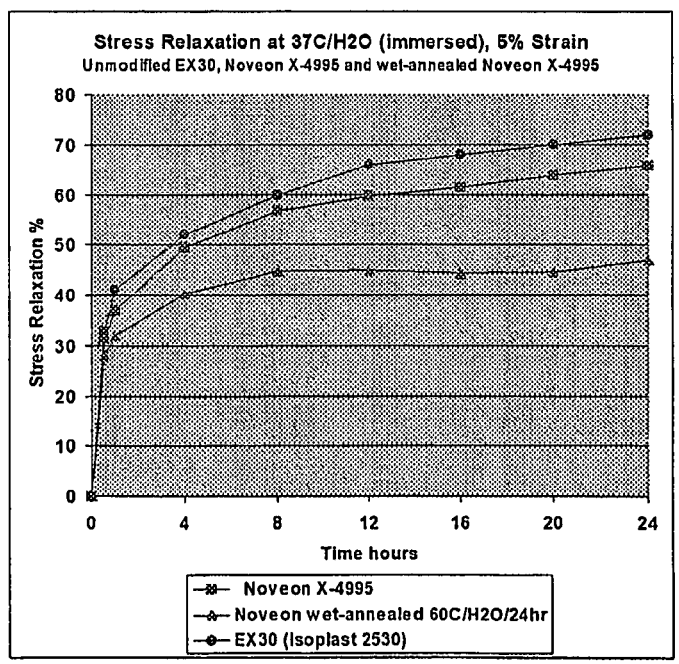
FIG. 13 is a plot of stress relaxation, in percent, as a function of time, in hours, the stress-relaxation measured at 95% relative humidity and 37° C. under 5% strain, for the polyurethane Estane® X-4995 untreated (squares) and wet-annealed at 60° C. in 100% humidity for 24 hours (triangles) and for the polyurethane Isoplast® 2530 untreated (circles)

The stress relaxation performance determined at 100% humidity of polymer articles comprised of the polyurethanes Isoplast® 2530 and Estane® X-4995 is shown in FIG. 13. The articles were of comparable thickness of 0.030 inches and were tested at 37° C. immersed in water for 24 hours under 5% strain. Polymer articles comprised of untreated Isoplast® 2530 (circles) and Estane® X-4995 (squares) had a stress relaxation at 24 hours of 72% and 66%, respectively. Wet-annealing of the polymer articles comprised of Estane® X-4995 (triangles) reduced stress relaxation to 47% at 24 hours; a 29% and 35% lower stress relaxation than untreated polyurethane counterparts.

Figure 14A:
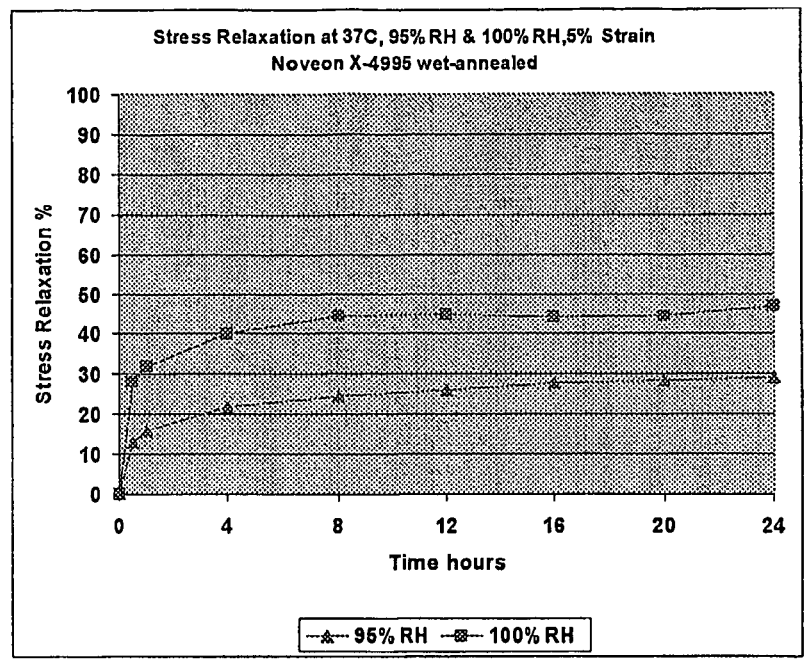
FIG. 14A is a plot of stress relaxation, in percent, as a function of time, in hours, for the polyurethane Estane® X-4995 wet-annealed at 65° C. in 100% humidity for 24 hours, the stress-relaxation measured at 37° C. with 95% relative humidity (triangles) and at 100% relative humidity (squares)
Figure 14B:
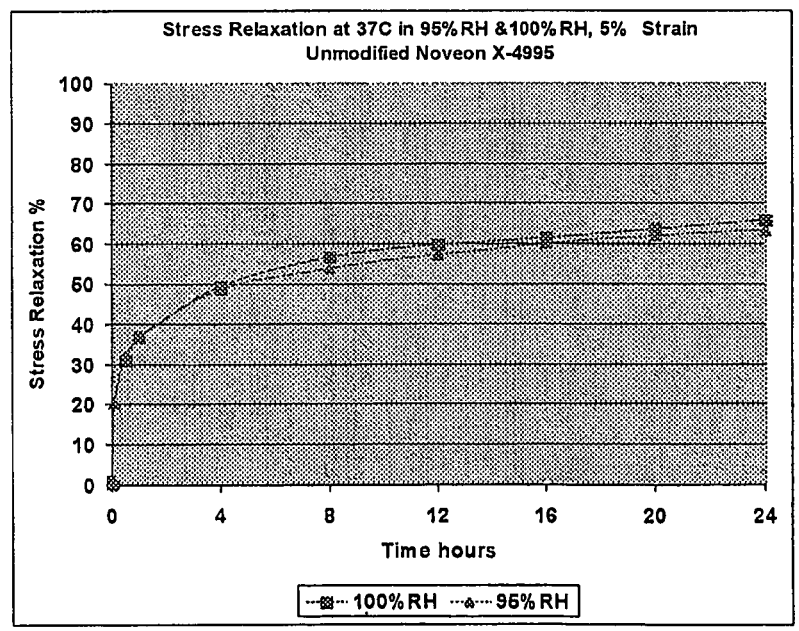
FIG. 14B is a plot of stress relaxation, in percent, as a function of time, in hours, for the polyurethane Estane® X-4995 untreated, the stress-relaxation measured at 95% relative humidity (triangles) and at 100% relative humidity (squares)

FIG. 14A compares the stress relaxation performance of a wet-annealed (65° C. in 100% humidity for 24 hours) polymer article prepared from the polyurethane Estane® X-4995 tested at 95% relative humidity (triangles) and at 100% relative humidity (squares). The 24 hour stress relaxation results are 29.1% and 46.8%, respectively, indicating that subjecting the article to 100% relative humidity is harsher than subjecting an article to 95% relative humidity. Stress relaxation of the polymer articles prior to wet-annealing was also measured at 95% relative humidity (triangles) and at 100% relative humidity (squares) and the results are shown in FIG. 14B. Stress relaxation of the polyurethane prior to thermal treatment is similar regardless of the relative humidity conditions during testing, with the sample tested at 95% relative humidity having a 24 hour stress relaxation of 63% and the sample tested at 100% relative humidity having a 24 hour stress relaxation of 66%.

Figure 15:
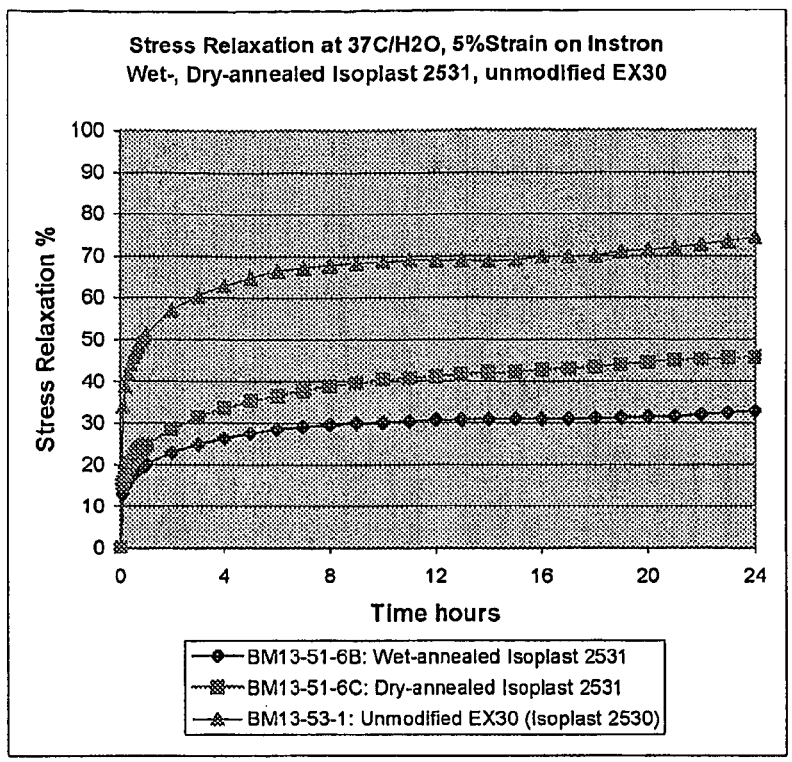
FIG. 15 is a plot of stress relaxation, in percent, as a function of time, in hours, for the polyurethane Isoplast® 2531 untreated (triangles), dry-annealed at 80° C. for 48 hours (squares), and wet-annealed at 65° C. in 100% humidity for 24 hours (diamonds), the stress relaxation measured at 100% relative humidity and 37° C. at 5% strain.

In another study, the stress relaxation performance of dry-annealed and wet-annealed Isoplast® 2531 was determined. The results of the study, where stress relaxation was measured at 100% relative humidity and 37° C. at 5% strain, are shown in FIG. 15. Polymer articles comprised of the polyurethane Isoplast® 2531 and not subjected to a thermal treatment (triangles) had a 24 hour stress relaxation of 74%. Dry-annealing of the article at 80° C. for 48 hours improved the stress relaxation, as seen by the decrease in the 24 hours stress relaxation to 46% (squares). Wet-annealing of the article at 65° C. in 100% humidity for 24 hours provided a further improvement in stress relaxation, by decreasing to 33% the stress relaxation at 24 hours. This result is consistent with the 95% relative humidity data presented above where the wet-annealing process resulted in the highest decrease in stress relaxation relative to dry-annealing or no treatment.

Figure 16:
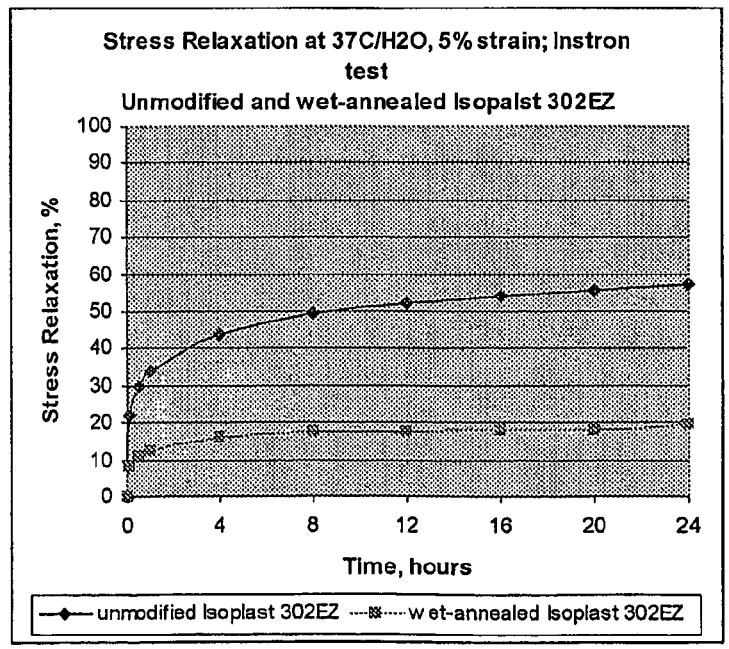
FIG. 16 is a plot of stress relaxation, in percent, as a function of time, in hours, for the polyurethane Isoplast® 302EZ untreated (diamonds) and wet-annealed at 80° C. in 100% humidity for 24 hours (squares), the stress relaxation measured at 100% relative humidity and 37° C. at 5% strain.

A similar study was conducted with the polyurethane identified by the tradename Isoplast® 302EZ. Polymer articles were tested for stress relaxation performance after wet annealing the articles at 80° C. for 24 hours in 100% humidity. Stress relaxation was measured at 100% relative humidity and 37° C. at 5% strain and the results for the wet-annealed article and for an untreated article are shown in FIG. 16. Polymer articles comprised of the polyurethane Isoplast® 302EZ and not subjected to a thermal treatment (diamonds) had a 24 hour stress relaxation of 57%. Wet-annealing of the article at 80° C. for 24 hours improved the stress relaxation, as seen by the decrease in the 24 hours stress relaxation to 20% (squares).

The studies above illustrate the reduction in stress relaxation achieved when polymer articles, particularly articles comprised of polyurethane or of PMMA, are heated at a temperature lower than the dry or wet glass transition temperature of the polymer for a period of time. The improvement in stress relaxation is evident when the articles is subjected to a load or force in a working environment, and in particular an environment having a relative humidity of at least 90%, more preferably at least 95%, or still more preferably greater than 95%. Thus, the invention contemplates heating a polymer article in an environment having a controlled relative humidity, where the heating temperature is between 5-25° C. below the dry or wet glass transition temperature. The controlled relative humidity can be a dry environment, where the heating temperature is between 5-25° C. below the dry glass transition temperature. A "dry" environment as used herein intends an environment that has less than at least about 50% relative humidity, more typically less than 10% relative humidity, more preferably a relative humidity of 5% or less. The environment can also be controlled to have a wet relative humidity where the article is heated to a temperature that is 5-25° C. below the wet glass transition temperature. As used herein, "wet" environment refers to an environment having a relative humidity of greater than about 90%, more typically of greater than about 95%.

In one embodiment, the polymer article is heated under conditions that do not induce crystallization of the polymer, so that the article after heating remains substantially amorphous. That is, no appreciable amount of crystallinity, as measured by, for example, x-ray diffraction or differential scanning calorimetry, is observed in the polymer article after heating. Typically, the heating conditions are selected to that formation of crystals is not promoted. For example, heating time and temperature can be varied to identify heating conditions that do not cause crystallization of the polymer article.

The method can be conducted on polymer articles that have been thermoformed into any desired geometry. In particular, a thermoformed article can be fabricated from a polymer sheet via pressure and/or vacuum thermoforming using a rigid mold. For example, a mold prepared from an impression of a human mouth can be used to fabricate an orthodontic device from the polymer sheet, as previously discussed with respect to Example 7. The orthodontic device is then subjected to the heat treatment method described herein to achieve improvement in the article's mechanical properties, as evidenced by a reduction in stress relaxation. The heat treatment can be conducted with the thermoformed article in place on the mold or with the thermoformed article removed from the mold.

Figure 17:
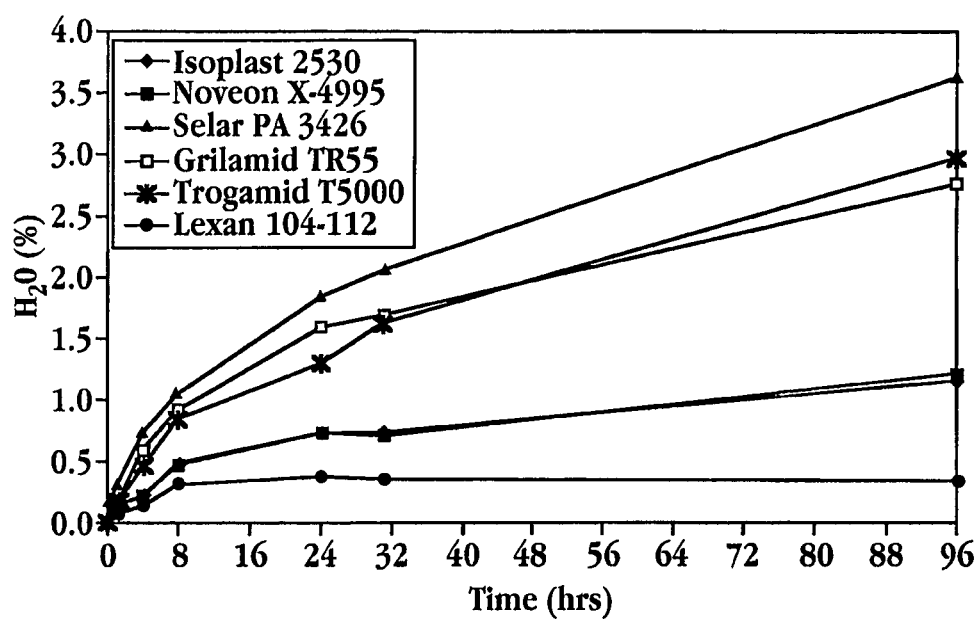
FIG. 17 is a plot of moisture uptake, in percent, as a function of time, in hours, polycarbonate (closed circles), polyester (open circles), the polyurethanes Isoplast® 2530 (closed diamonds) and Estane® X-4995 (open diamonds), and the polyamides Selar® 3426 (triangles), Grilamid® TR55 (open squares), Grilamid® TR90 (closed squares), and Trogamid® T5000 (X symbols)

In another study, described in Example 11, the beneficial effects of the heat treatment method one polymer articles prepared from polyester, polycarbonate, polyamide, and polyurethane was illustrated. Samples of the polymers were placed in water at room temperature for 7 days (168 hours). The moisture uptake of the polymers was determined by weighing the samples prior to water immersion and at intervals during the 7 day immersion period. The moisture uptake as a function of time is shown in FIG. 17 for polycarbonate (closed circles), polyester (open circles), the polyurethanes Isoplast® 2530 (closed diamonds) and Estane® X-4995 (open diamonds), and the polyamides Selar® 3426 (triangles), Grilamid® TR55 (open squares), Grilamid® TR90 (closed squares), and Trogamid® T5000 (X symbols). Polycarbonate has a relatively low moisture uptake of about 0.38% at 24 hours. Increased time in contact with water did not lead to an increase in moisture uptake. The two polyurethanes both had moisture uptakes of about 0.7% at 24 hours and about 1.2% over 96 hours. The polyamides were considerably more hygroscopic than polycarbonate, with moisture uptakes of between 1.3-1.8% at 24 hours and of between 2.7-3.6% at 96 hours. As described above, polymer articles formed from polymers with a moisture uptake over 24 hours of greater than about 0.4% and less than about 2.5% and that are intended for use in a wet environment, benefit from the method described herein. A wet, warm (e.g., greater than 25° C.) environment is detrimental to the mechanical properties of polymers that have moisture uptake of between 0.4-2.5%, inclusive. These polymers when treated according to the method benefit by heat treatment at a temperature 5-25° C. below the wet glass transition temperatures, as will now be illustrated.

Figure 18A:
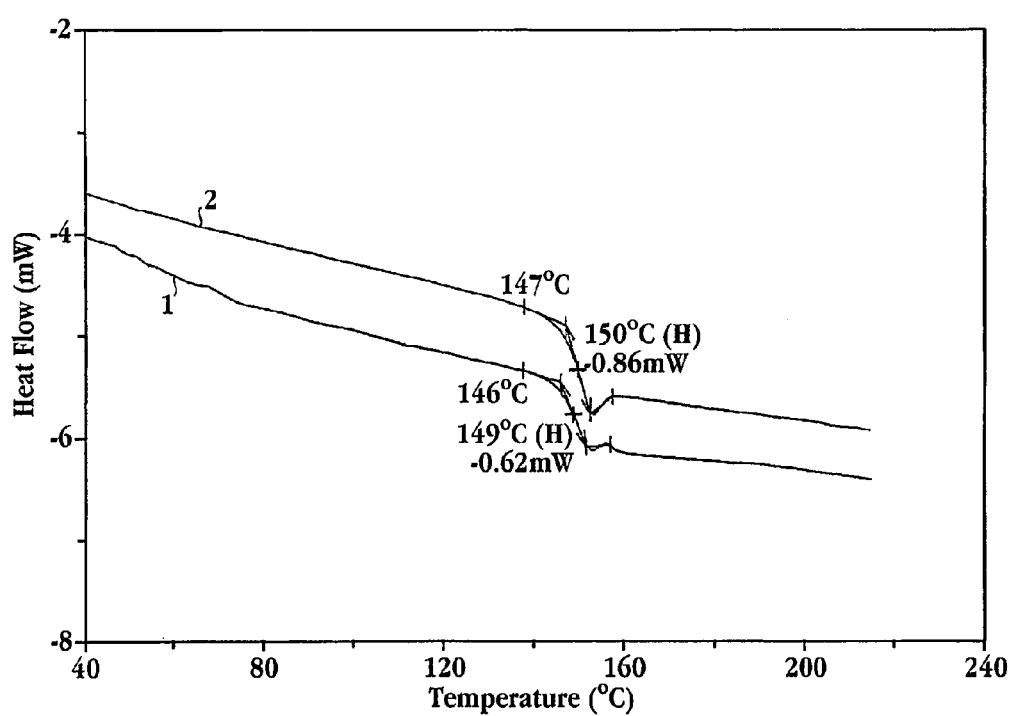
FIGS. 18A-18D are differential scanning calorimetry scans of a polycarbonate (Lexan®, FIG. 18A) and of three polyamides sold under the trade designations Grilamide® (FIG. 18B), Trogamid® (FIG. 18C) and Selar® (FIG. 18D), where the DSC scans show the "wet" glass transitions observed during the first heat scan of polymer samples that had been immersed for 24 hours in water.
Figure 18B:
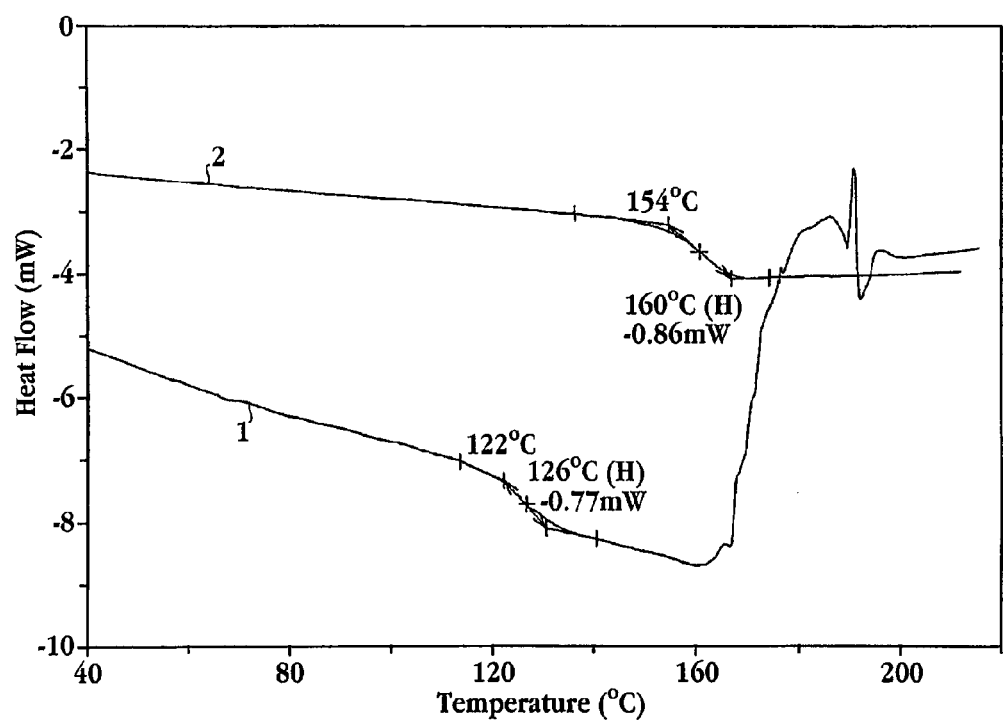
Figure 18C:
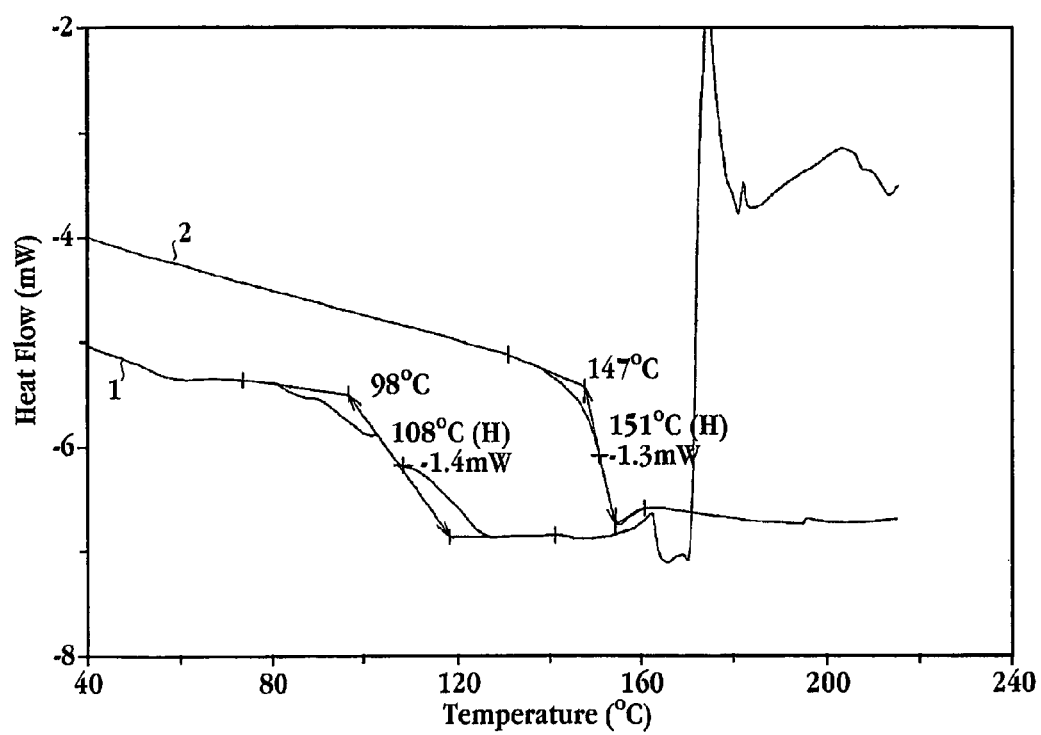
Figure 18D:
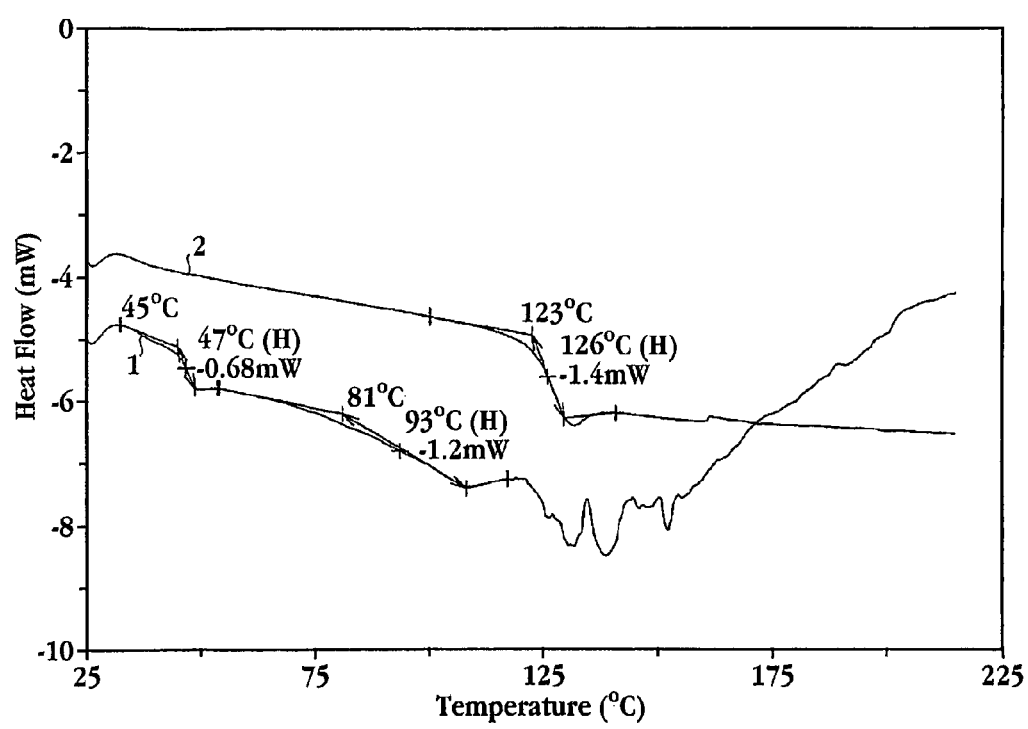

The wet glass transition temperatures of the polymers was determined by DSC, as described in Example 11A. The DSC scans are shown in FIGS. 18A-18D for polycarbonate (Lexan®, FIG. 18A) and of three polyamides sold under the trade designations Grilamide® TR55 (FIG. 18B), Trogamid® T5000 (FIG. 18C) and Selar® 3426 (FIG. 18D). The wet glass transition, taken as the midpoint of the transition observed during the first heat of the polymer sample, was 149° C. for polycarbonate (FIG. 18A), 126° C. for the polyamide Grilamide® TR55 (FIG. 18B), 108° C. for the polyamide Trogamid® T5000 (FIG. 18C), and 93° C. for the polamide Selar® 3426 (FIG. 18D). The second heat traces in the DSC scans of FIGS. 11A-11B provide an indication of the dry glass transition temperatures of the polymers. The depression in the glass transition due to the presence of water in the polymers that have a moisture uptake of greater than about 0.4% is apparent.

In another embodiment, a method is provided to determine the appropriate temperature for heating a polymer in a wet environment when the wet glass transition temperature is unknown. This approach is beneficial in that literature sources that tabulate dry glass transition values are readily available. In this embodiment, the moisture uptake of the polymer is determined, for example, by a weight change of a polymer sample immersed in water for a period of time (see, Example 11A). The temperature range over which the heating step is conducted is taken as [TgD−(5+(20*percent moisture uptake))] to about [TgD−(30+(20*percent moisture uptake))], where TgD is the dry glass transition temperature of the polymer article. For example, for the polyamide polymer Selar®, the percent moisture uptake at 24 hours was 1.9% (see FIG. 17; Table H in Example 11). The dry glass transition temperature of the polyamide can be discerned from a literature source or measured or calculated. The DSC scan in FIG. 18D shows the dry glass transition temperature of about 126° C. Thus, the appropriate temperature to heat the polymer is determined from the equation to be 58° C. to about 83° C. A cross check with the measured wet glass transition temperature of the polyamide Selar® 3426 (FIG. 18D), shows that the calculated temperature range of 58-83° C. to encompass the range determined based on 5-25° C. below the wet Tg of 93° C. (68-88° C.).

The stress relaxation of the polymers was measured at various times during dry or wet annealing at about 15° C. below the dry glass transition temperature or the wet glass transition temperature, respectively (see Example 11C). As controls, the stress relaxation was measured on polymer samples not subjected to heat treatment. Stress relaxation of all samples, not heat treated and heat treated, was measured after preconditioning the sample at 37° C. for 24 hours at either 50% relative humidity or 95% relative humidity. FIGS. 19A-19H are plots of percent stress relaxation as a function of time for the polymer samples, where each plot shows the data for unannealed samples/preconditioned at 37° C., 50% RH (open squares), unannealed samples/preconditioned at 37° C., 95% RH (closed squares), dry annealed samples/preconditioned at 37° C., 50% RH (open circles), dry annealed samples/preconditioned at 37° C., 95% RH (closed circles), wet annealed samples/preconditioned at 37° C., 95% RH (triangles). Table J in Example 11 summarizes the heat treatment conditions for the various polymers and shows the stress relaxation value at the 24 hour time point.

Figure 19A:
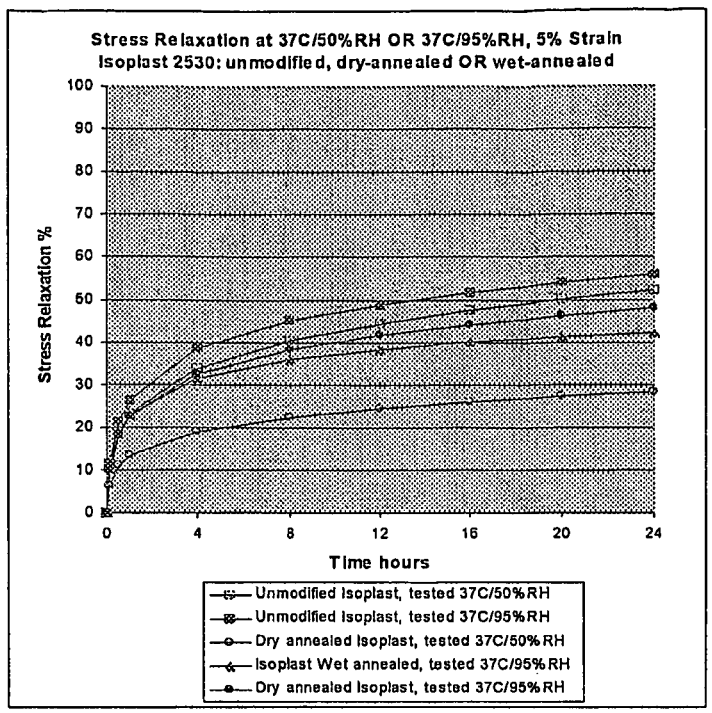
FIGS. 19A-19H are plots of percent stress relaxation as a function of time for polymer articles comprised of polyurethane (Isoplast® 2530, FIG. 19A), polyurethane (Estane® X-4995, FIG. 19B), polyamide (Grilamide® TR55, FIG. 19C), polyamide (Grilamide® TR90, FIG. 19D), polyamide (Selar® PA 3426, FIG. 19E), polyamide (Trogamide® T5000, FIG. 19F), polyester (Eastar® 6763, FIG. 19G), and polycarbonate (Lexan® 104-112, FIG. 19H), where each plot shows the data for unannealed samples/preconditioned at 37° C., 50% RH (open squares), unannealed samples/preconditioned at 37° C., 95% RH (closed squares), dry annealed samples/preconditioned at 37° C., 50% RH (open circles), dry annealed samples/preconditioned at 37° C., 95% RH (closed circles), wet annealed samples/preconditioned at 37° C., 95% RH (triangles)

FIG. 19A shows the percent stress relaxation for a polymer articles comprised of polyurethane (Isoplast® 2530) subjected to the various heat treatments. The data is summarized in Table K in Example 11. Annealing the polyurethane article at 80° C. for 24 hours in a dry environment (RH <5%) reduced stress relaxation to 28.3% (open circles), from 52.1% for the untreated control (open squares), when measured at 37° C./50% relative humidity. Annealing the polyurethane article at 80° C. for 24 hours in a dry environment (RH <5%) reduced stress relaxation to 48% (closed circles), from 55.8% for the untreated control (closed squares), when measured at 37° C./95% relative humidity. Annealing the polyurethane article at 60° C. for 24 hours in a wet environment (RH 100%) reduced stress relaxation to 42.2% (triangles), from 55.8% for the untreated control (closed squares), when measured at 37° C./95% relative humidity.

Figure 19B:
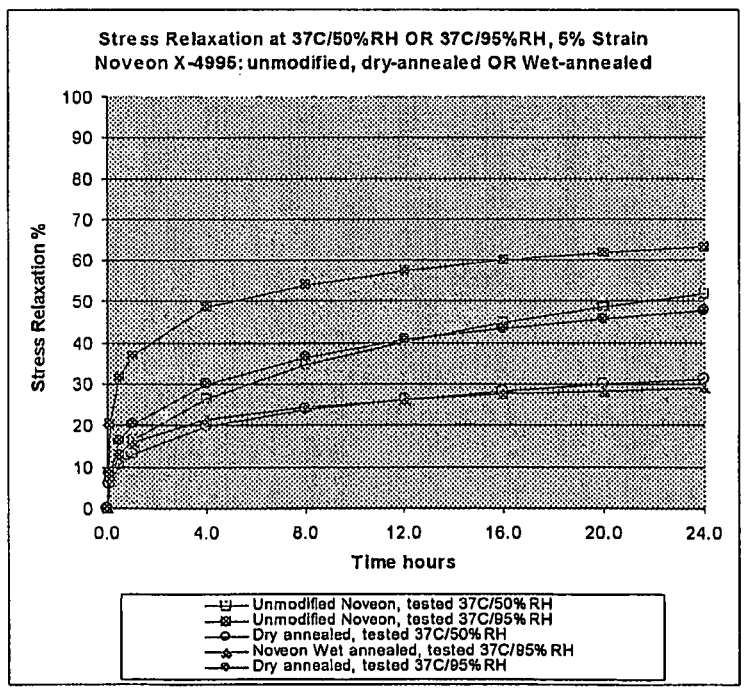

FIG. 19B shows the percent stress relaxation for a polymer article comprised of polyurethane (Estane® X-4995) subjected to the various heat treatments. The data is summarized in Table L in Example 11. Annealing the polyurethane article at 80° C. for 24 hours in a dry environment (RH <5%) reduced stress relaxation to 31.2% (open circles), from 51.8% for the untreated control (open squares), when measured at 37° C./50% relative humidity. Annealing the polyurethane article at 80° C. for 24 hours in a dry environment (RH <5%) reduced stress relaxation to 47.8% (closed circles), from 63.3% for the untreated control (closed squares), when measured at 37° C./95% relative humidity. Annealing the polyurethane article at 60° C. for 24 hours in a wet environment (RH 100%) reduced stress relaxation to 29.1% (triangles), from 63.3% for the untreated control (closed squares), when measured at 37° C./95% relative humidity.

Figure 19C:
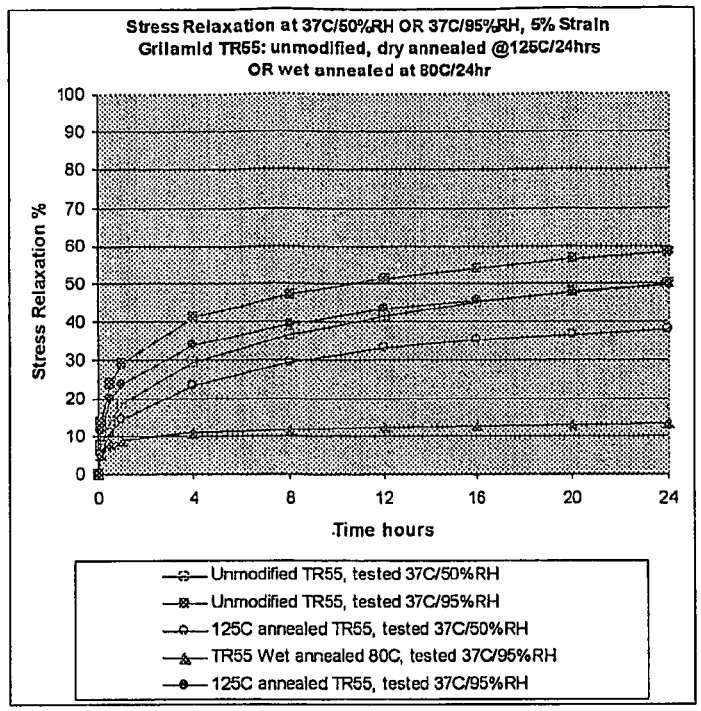

FIG. 19C shows the percent stress relaxation for a polymer articles comprised of polyamide (Grilamid® TR55) subjected to the various heat treatments. The data is summarized in Table M in Example 11. Annealing the polyamide article at 125° C. for 24 hours in a dry environment (RH <5%) reduced stress relaxation to 38% (open circles), from 50.2% for the untreated control (open squares), when measured at 37° C./50% relative humidity. Annealing the polyamide article at 125° C. for 24 hours in a dry environment (RH <5%) reduced stress relaxation to 49.5% (closed circles), from 58.2% for the untreated control (closed squares), when measured at 37° C./95% relative humidity. Annealing the polyamide article at 80° C. for 24 hours in a wet environment (RH 100%) reduced stress relaxation to 13.4% (triangles), from 58.2% for the untreated control (closed squares), when measured at 37° C./95% relative humidity.

Figure 19D:
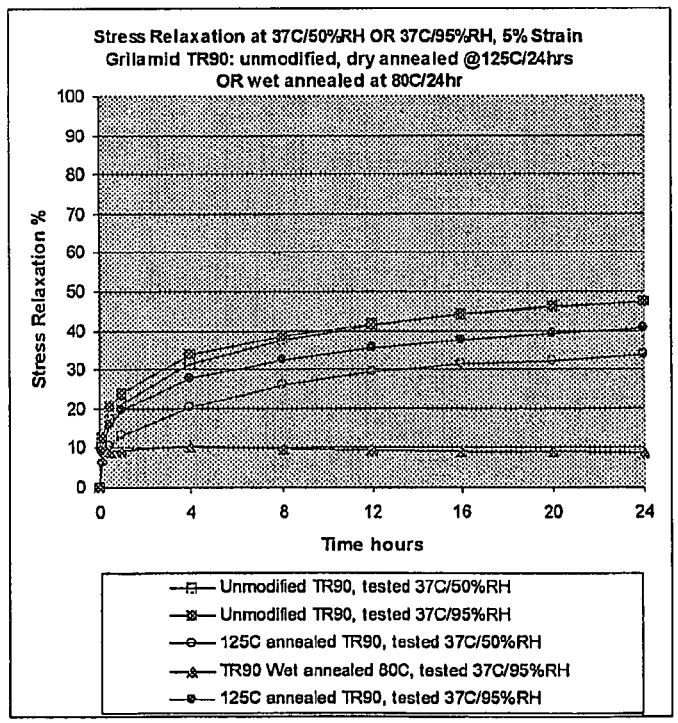

FIG. 19D shows the percent stress relaxation for a polymer article comprised of polyamide (Grilamid® TR90) subjected to the various heat treatments. The data is summarized in Table N in Example 11. Annealing the polyamide article at 125° C. for 24 hours in a dry environment (RH <5%) reduced stress relaxation to 33.7% (open circles), from 47.4% for the untreated control (open squares), when measured at 37° C./50% relative humidity. Annealing the polyamide article at 125° C. for 24 hours in a dry environment (RH <5%) reduced stress relaxation to 40.6% (closed circles), from 47.3% for the untreated control (closed squares), when measured at 37° C./95% relative humidity. Annealing the polyamide article at 80° C. for 24 hours in a wet environment (RH 100%) reduced stress relaxation to 8.8% (triangles), from 47.3% for the untreated control (closed squares), when measured at 37° C./95% relative humidity.

Figure 19E:
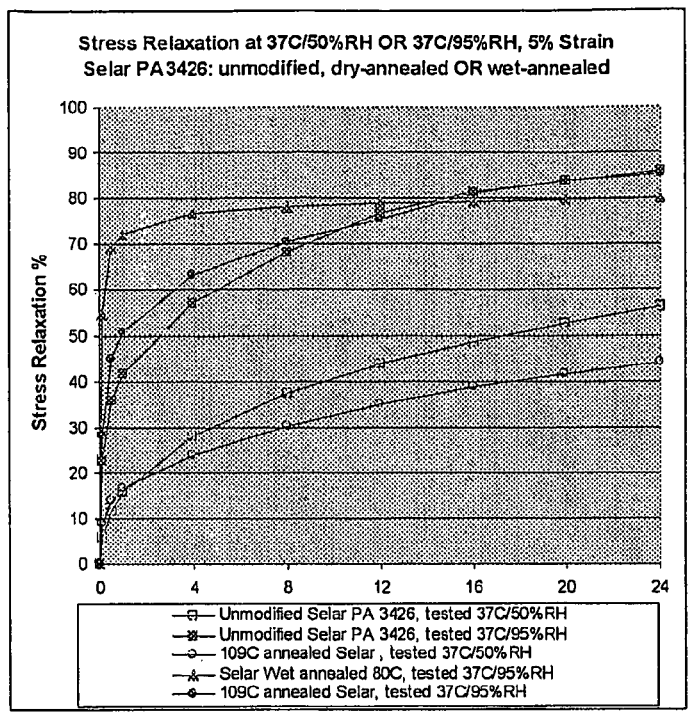

FIG. 19E shows the percent stress relaxation for a polymer articles comprised of polyamide (Selar® PA 3426) subjected to the various heat treatments. The data is summarized in Table O in Example 11. Annealing the polyamide article at 109° C. for 24 hours in a dry environment (RH <5%) reduced stress relaxation to 44.1% (open circles), from 56.1% for the untreated control (open squares), when measured at 37° C./50% relative humidity.

Figure 19F:
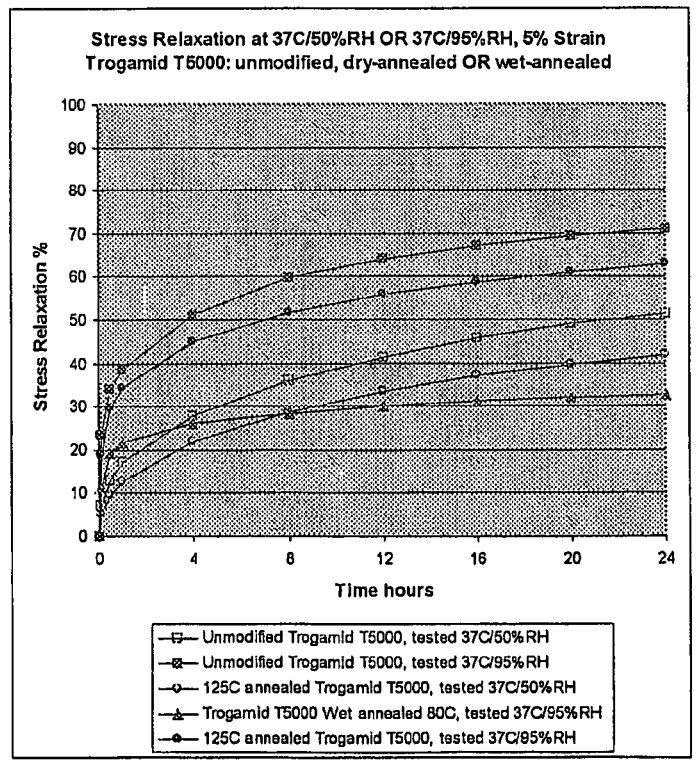

FIG. 19F shows the percent stress relaxation for a polymer articles comprised of polyamide (Trogamid® T5000) subjected to the various heat treatments. The data is summarized in Table P in Example 11. Annealing the polyamide article at 125° C. for 24 hours in a dry environment (RH <5%) reduced stress relaxation to 42% (open circles), from 51.4% for the untreated control (open squares), when measured at 37° C./50% relative humidity. Annealing the polyamide article at 125° C. for 24 hours in a dry environment (RH <5%) reduced stress relaxation to 63% (closed circles), from 71.1% for the untreated control (closed squares), when measured at 37° C./95% relative humidity. Annealing the polyamide article at 80° C. for 24 hours in a wet environment (RH 100%) reduced stress relaxation to 32.6% (triangles), from 71.1% for the untreated control (closed squares), when measured at 37° C./95% relative humidity.

Figure 19G:
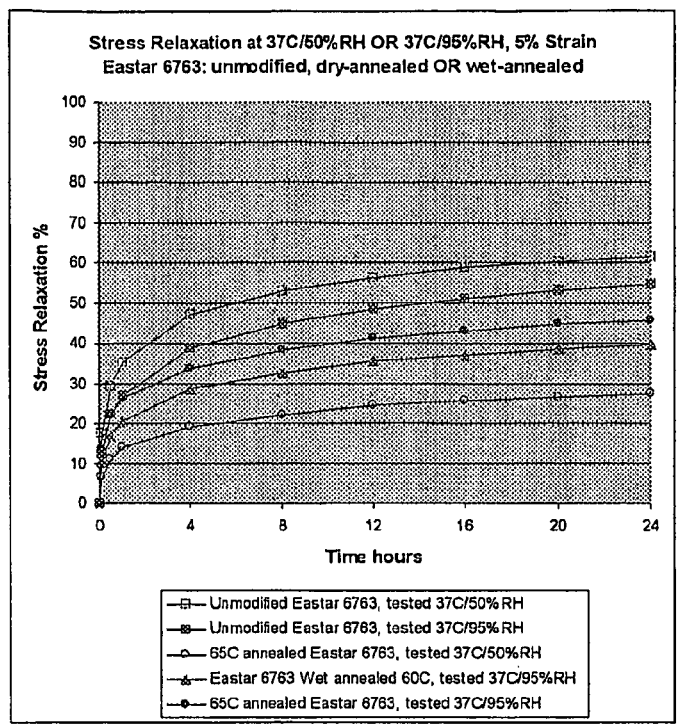

FIG. 19G shows the percent stress relaxation for a polymer articles comprised of polyester (Eastar® 6763) subjected to the various heat treatments. The data is summarized in Table Q in Example 11. Annealing the polyester article at 65° C. for 24 hours in a dry environment (RH <5%) reduced stress relaxation to 27.6% (open circles), from 61.5% for the untreated control (open squares), when measured at 37° C./50% relative humidity. Annealing the polyester article at 65° C. for 24 hours in a dry environment (RH <5%) reduced stress relaxation to 45.8% (closed circles), from 54.7% for the untreated control (closed squares), when measured at 37° C./95% relative humidity. Annealing the polyester article at 60° C. for 24 hours in a wet environment (RH 100%) reduced stress relaxation to 39.8% (triangles), from 54.7% for the untreated control (closed squares), when measured at 37° C./95% relative humidity.

Figure 19H:
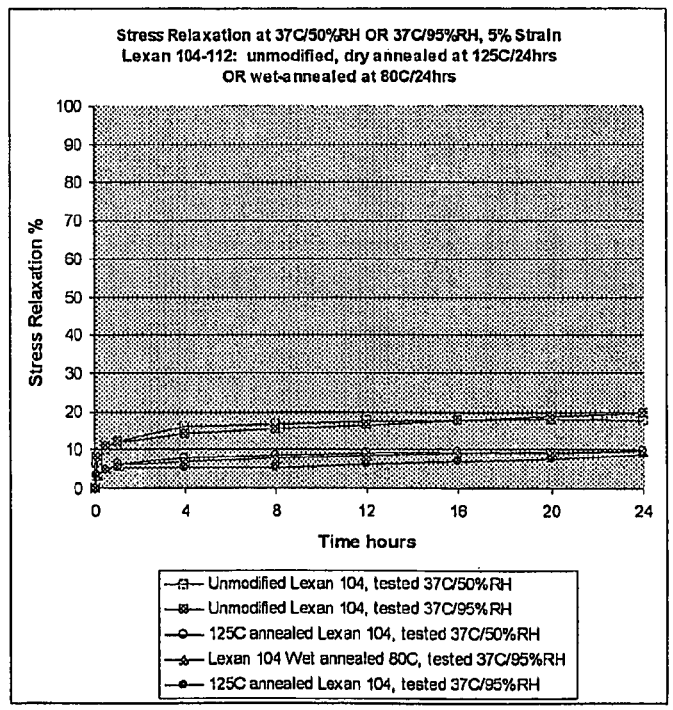

FIG. 19H shows the percent stress relaxation for a polymer articles comprised of polycarbonate (Lexan® 104-112) subjected to the various heat treatments. The data is summarized in Table R in Example 11. Annealing the polycarbonate article at 125° C. for 24 hours in a dry environment (RH <5%) reduced stress relaxation to 9.8% (open circles), from 17.8% for the untreated control (open squares), when measured at 37° C./50% relative humidity. Annealing the polycarbonate article at 125° C. for 24 hours in a dry environment (RH <5%) reduced stress relaxation to 8.9% (closed circles), from 19.6% for the untreated control (closed squares), when measured at 37° C./95% relative humidity. Annealing the polycarbonate article at 104° C. for 24 hours in a wet environment (RH 100%) reduced stress relaxation to 9.8% (triangles), from 19.6% for the untreated control (closed squares), when measured at 37° C./95% relative humidity.

The data presented in FIGS. 19A-19H illustrate the following general trends in stress relaxation for all the polymers tested: (1) Polymer articles dry-annealed and tested for stress relaxation in 'dry' (50% RH) conditions showed significant improvement in stress relaxation relative to unmodified (unannealed) counterparts; with the reduction in stress relaxation after heat treatment ranging from 18% to 55%; (2) the stress relaxation of unannealed, control polymer articles tested under wet (95% RH) conditions showed higher stress relaxation than counterparts tested under 'dry' (50% RH) conditions; i.e., high humidity is detrimental to stress relaxation in polymer articles damages the SR performance in polymer articles not subjected to heat treatment; (3) dry-annealing improves the stress relaxation performance of the polymer article in high humidity (95% RH) test conditions by 1-25%; and (4) wet-annealing improves the stress relaxation performance in high humidity (95% RH) test conditions by 7-82%. These final observations were unexpected since high humidity normally translates to poorer stress relaxation performance, as observed with for the stress relaxation tested under high humidity (wet) conditions of polymer articles not subjected to heat treatment.

Figure 20A:
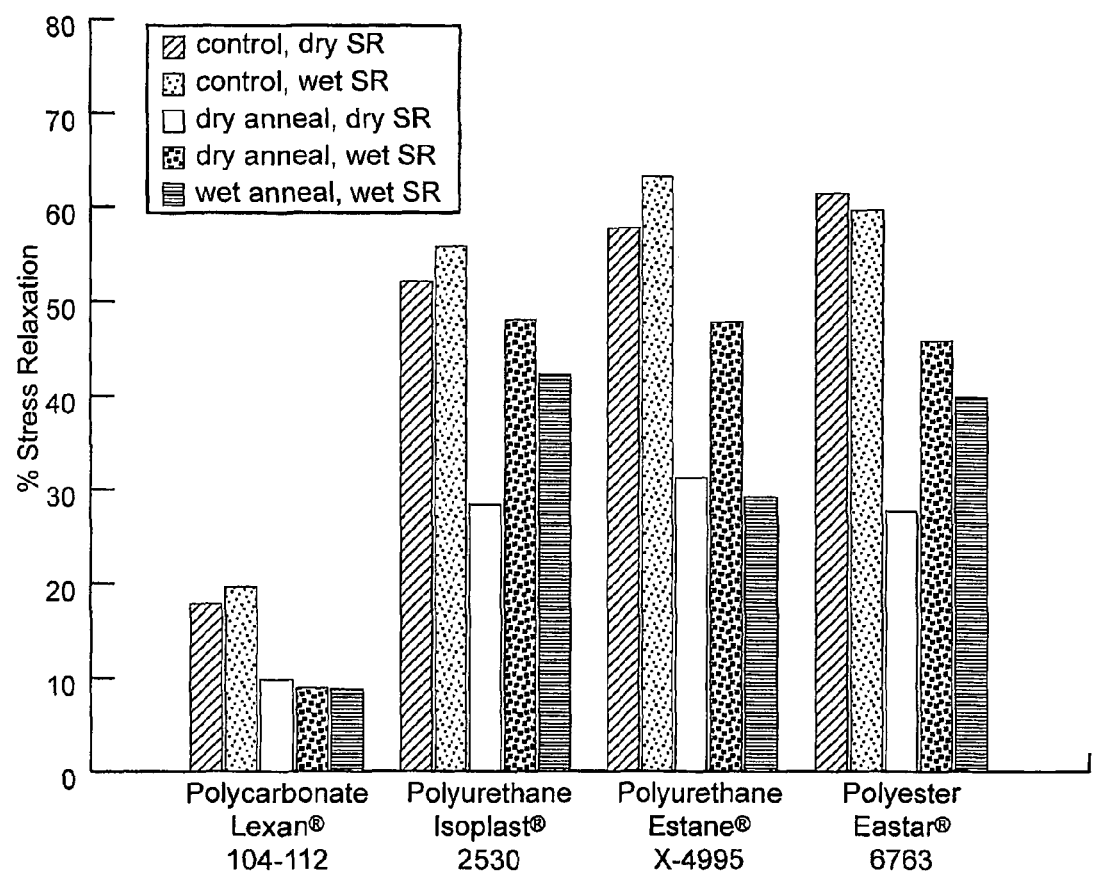
FIGS. 20A-20B are bar graphs showing the percent stress relaxation of the indicated polymers with no heat treatment, the stress relaxation measured with the polymer in a dry state and a wet state, and of the indicated polymers after dry heat treatment and wet heat treatment, the stress relaxation measured with the polymer in a dry state and a wet state.
Figure 20B:
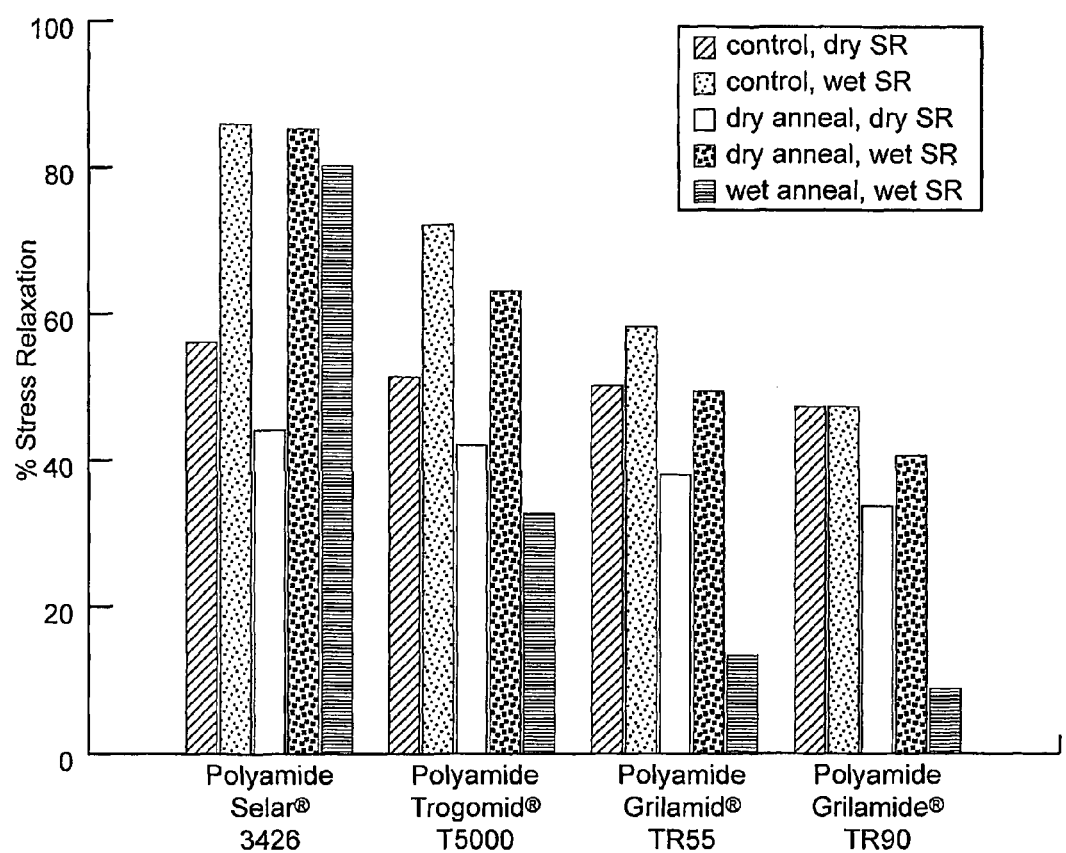

FIGS. 20A-20B are bar graphs summarizing the stress relaxation values at the 24 hour time point for the polymer articles presented in FIGS. 19A-19H. The data illustrates points (1)-(4) discussed in the foregoing paragraph. The detrimental effect of the wet environment on the stress relaxation of the polymers is apparent, particularly for the polyamide and polyurethane polymers that have a moisture uptake of greater than about 0.4%. The polyamide Selar® 3426, which had the highest moisture uptake of the polymers tested (see FIG. 11), had a stress relaxation of 56% for a dry sample. The wet sample of polymer had a stress relaxation of 86%. Annealing the polymer below the TgD or below the TgW provided some improvement in stress relaxation. Polyurethane polymer articles had stress relaxations of around 52% for a dry sample and 56%-63% for a wet sample. Annealing the sample below TgD in a dry environment improved stress relaxation by reducing it to around 30%. Annealing the sample in a wet environment below the TgW also improved stress relaxation. Polycarbonate and polyester polymer articles were similarly improved by annealing below the wet or dry glass transition.

The data presented in the foregoing examples illustrates the beneficial effects of heating rigid, amorphous polymers that have a 24 hour moisture uptake of between about 0.4-2.5%, inclusive, at a temperature below the glass transition temperature for a period of time. The heating can be conducted in a dry environment or in a wet environment. For polymer articles that are intended for use in a wet environment the heating is optimally conducted in a wet environment to maximize the improvement in mechanical properties, and in particular the reduction in stress relaxation during use.

It will be appreciated that a variety of modifications can be made to the process described herein depending on the specific characteristics of the polymer resin and the desired result. For example, the heating step when done in a wet environment can be conducted in the presence of a polar solvent such as ethanol, methanol, or isopropanol in combination with water or as a substitute for the water. In this case, the polymer may initially soften and removal of any residual solvent after heating and prior to subjecting the article to significant stress or strain may be desired. Additionally, an optional cooling step following the step of heating may be used, where for example, the polymer article is cooled to below ambient (e.g. 5° C. or −10° C.) prior to use. Different polymer compositions will have different initial Tg properties and thus will benefit from different thermal processes. Generally, however, heat treatment conducted at temperatures of from about 5-50° C., more preferably 5-25° C., and still more preferably 10-25° C. below the glass transition achieves improved mechanical properties. The method is particularly applicable to polymer articles that are formed from a hygroscopic polymer, e.g., one having a 24 hour moisture uptake of between about 0.4-2.5% at 24 hours, and that are intended for use in a wet environment.

The heat treatment method can be applied to a wide range of polymers, in addition to the amorphous, rigid polymers discussed above. The polyurethanes are an exemplary family of rigid, amorphous polymers, and broadly include any polymers prepared by reaction of methylene diphenyl isocyanate (MDI; diphenylmethane diisocyanate), toluene-2,4-diisocyanate (TDI), isophorone di-isocyanate, phenylene diisocyanate, cyclohexane diisocyanate, or hydrogenated MDI with aliphatic diols, such as hexane diol, butane diol, propane diol, etc. Example of specific diols suitable for reaction with an isocyanate include 1,4 butanediol, 1,6 hexanediol, propylene glycol, dipropylene glycol, and 1,4-cyclohexanedimethanol (1,4-bis(hydroxymethyl)cyclohexane).

Polyamides, polycarbonates, polyesters, and polyether diols are other examples of rigid amorphous polymers that benefit from the method. Certain biphasic polyurethanes are also benefited, for example the high hard segment content polyether polyurethane sold under the trade name Pellethane® 2301-75 D, as well as polyamides and polyureas having high levels of hard blocks.

In one embodiment, the amorphous, rigid polymer contemplated for use are any amorphous, rigid polymers excluding polysulfone, polyethersulfone, polyphenylsulfone, polyimide, and polyetherimide.

Polymer articles formed from an elastomer also benefit from the heat treatment method. Example 13 describes preparation of a polymer article from an elastomer and heat treatment of the article 5-25° C. below the glass transition temperature of the article. Measurement of the set properties of the article after heat treatment show improvement relative to a control article not heat treated.

Examples of classes of elastomers include anionic triblock copolymers, polyolefin-based thermoplastic elastomers, thermoplastic elastomers based on halogen-containing polyolefins, thermoplastic elastomers based on dynamically vulcanized elastomer-thermoplastic blends, thermoplastic polyether ester or polyester based elastomers, thermoplastic elastomers based on polyamides or polyimides, ionomeric thermoplastic elastomers, hydrogenated block copolymers in thermoplastic elastomer interpenetrating polymer networks, thermoplastic elastomers by carbocationic polymerization, polymer blends containing styrene/hydrogenated butadiene block copolymers, and polyacrylate-based thermoplastic elastomers. Some specific examples of elastomers are natural rubber, butyl rubber, EPDM rubber, silicone rubber such as polydimethyl siloxane, polyisoprene, polybutadiene, polyurethane, ethylene/propylene/diene terpolymer elastomers, chloroprene rubber, styrene-butadiene copolymers (random or block), styrene-isoprene copolymers (random or block), acrylonitrile-butadiene copolymers, mixtures thereof and copolymers thereof. The block copolymers may be linear, radial or star configurations and may be diblock (AB) or triblock (ABA) copolymers or mixtures thereof. Blends of these elastomers with each other or with modifying non-elastomers are also contemplated. Commercially available elastomers include block polymers (e.g., polystyrene materials with elastomeric segments), available from Shell Chemical Company of Houston, Tex., under the designation Kraton®.

In another aspect, the invention provides polymer articles having improved mechanical properties, and in particular an improved dimensional stability as evidenced by a reduction in stress relaxation and/or an improved dimensional stability as evidenced by a reduction in compression and/or tensile set. The articles after thermoforming are heat treated in a wet or a dry environment at a temperature that is 5-25° C. below the wet or dry glass transition temperature of the polymer. For articles that have a moisture uptake of between about 0.4-2.5%, inclusive, more generally of between 0.4-3.0%, inclusive, and that are intended for use in an environment having a relative humidity of greater than about 50%, more preferably of greater than about 75%, still more preferably of greater than about 95%, benefit significantly from the heat treatment as illustrated in the Examples above. While a considerable improvement is realized with polymers having a certain water uptake and intended for use in a wet environment, the method is also applicable to (1) polymers that have a certain water uptake (e.g., moisture uptake of 0.4-2.5%) and that will be used in a dry environment and (2) polymers with little moisture uptake (e.g., moisture uptake less than about 0.4%) that will be used in dry or a wet environment.

In one embodiment of this aspect, the polymer article is a device worn in the mouth of a human subject, such as an orthodontic device. Exemplary devices include retainers, dentures, and devices for incrementally repositioning teeth. Such devices are known in the art (see for example U.S. Pat. Nos. 5,975,893; 6,217,325; 4,798,534) and are often formed of a rigid, amorphous polymer, such as a polyurethane, a polyester, or a polycarbonate. The warm, wet environment in which the article is used is detrimental the mechanical properties of the polymer, and it has been particularly observed that the increase in stress relaxation of the polymer renders the devices less effective with time. The invention contemplates treating the orthodontic device by heating in a wet environment or in a dry environment at a temperature that is 5-25° C. below the glass transition temperature of the article. When the heating is conducted in a wet environment, the selected heating temperature is 5-25° C. below the wet glass transition temperature. When the heating is conducted in a dry environment, the selected heating temperature is 5-25° C. below the dry glass transition temperature.

Other exemplary polymers article that will benefit from the heat treatment method described herein include a load-bearing catheter, tubing used in medical, industrial and automotive applications, components used in solar water heaters, bullet-proof windows and armor, and sun glasses. These examples are not intended to be limiting but are merely exemplary and additional polymer articles that would benefit from the heat treatment method can be identified by those of skill upon realizing the benefits to be achieved by the method.

III. EXAMPLES

The following examples further illustrate the invention described herein and are in no way intended to limit the scope of the invention.

Materials:

Polyurethane polymers sold under the trade names Estane® (Noveon Inc., Cleveland, Ohio) and Isoplast® (The Dow Chemical Co., Midland Mich.) were obtained commercially.

Polyamide polymers sold under the trade names Selar® PA 3426 (DuPont, Wilmington Del.), Grilamide® TR55 (EMS-CHEMIE, Sumter, S.C.), and Trogamid® T5000 (Degussa Corp., Akron Ohio) were obtained commercially.

Polymethylmethacrylate sold under the trade name Acrylic was obtained from Tap Plastics, Inc.

The polycarbonate polymer sold under the trade designation Lexan® 104-112 was obtained commercially.

Polyethyleneterephthalate glycol (PETG) copolyester sold under the trade designation Eastar® 6763 (Eastman Chemical Co., Kingsport Tenn.) was obtained commercially.

Methods:

1. Stress Relaxation

Stress Relaxation was measured according to a standard operating procedure based on ASTM 790-02. The stress relaxation tests performed at 37° C. and 95% relative humidity (RH) were done in a humidity chamber (Hotpack, Warminster Pa.). The stress relaxation test apparatus (described in following paragraph and shown in FIG. 1A) was placed in the humidity chamber. After mounting a sample, it was equilibrated in the chamber for 15 minutes prior to initiating the test.

A flexural creep testing system 10, shown in FIG. 1A, was designed with five testing stations, each equipped with a separate load cell. In the test, a rectangular test sample 12 (2.5 inches×1.9 inches×0.03 inches) was punched from an extruded sheet. The sample was clamped via clamp 14 midway onto a flat support spacer 16 and anchored to a 5 pound load cell 18 (Omega Engineering, Inc.). A deflector 20 was initially retracted to allow the clamped sample to freely suspend from support spacer 16. The support spacer and the retractable deflector were geometrically designed to provide a desired level of strain rate during testing by maintaining a constant deflection, D, and support span. The stress relaxation test was initiated by mounting deflector 20 on load cell 18 and flexing free end 12a of the test sample upwards to rest on the deflector. The load cell was connected to a data acquisition unit (HP 34970A Data Acquisition Switch Unit, not shown). The load cell was powered with a regulated DC power supply set to 10 Volts. As the sample was deflected, the load exerted by the sample on the load cell was detected in millivolts. Over the duration of a test at constant deflection, the decaying load data was measured in millivolts and stored.

The test strain rate was calculated as $6Dd/L^2$, where D=deflection (inch), d=sample thickness (inch), and L=full span (inch). The deflection (D) was constant at 0.321 inches in all tests; the span was varied to allow strain rates between 1-5%. The thickness (d) was measured using calibrated calipers. Load data was used to calculate the stress (S) in pounds-force per square inch (psi) as $S=3PL/2bd^2$, where S=stress (psi), P=load (lb-f), L=span (inch); b=width (inch); and d=depth (inch). Stress relaxation was calculated from the stress data as percent stress relaxation (SR %)=$100*(stress_i-stress_f)/stress_i$, where $stress_i$ is the stress at initiation of the test and $stress_f$ is the stress at another, later time point.

Figure 1B:
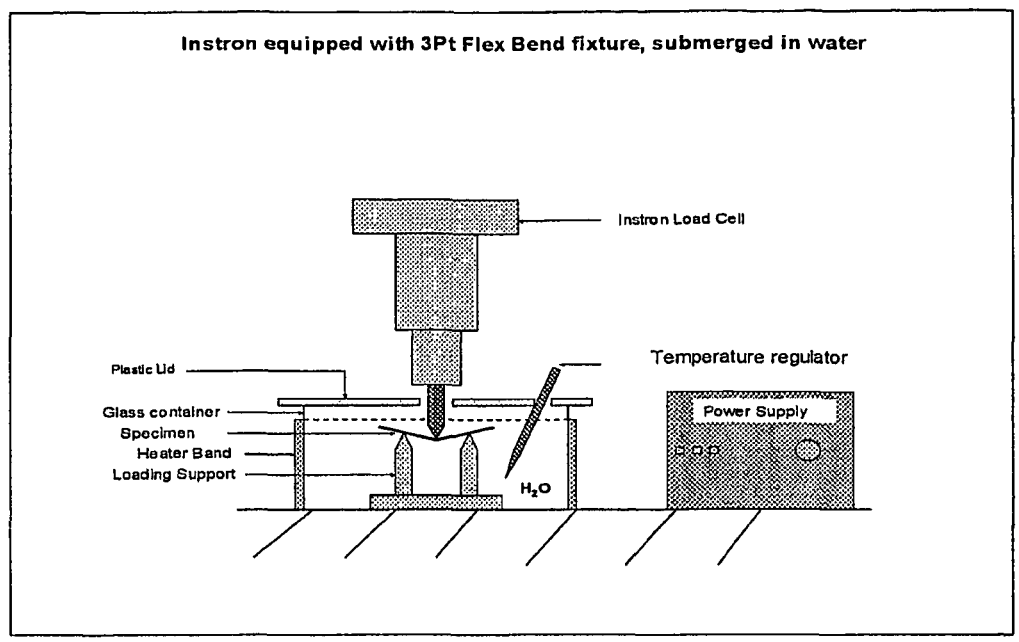

FIG. 1B shows the apparatus for conducting stress relaxation tests at 100% humidity. The tests were run on an Instron® model no. 5543 following the standard operating procedure for a flexural creep test (ASTM D2990-01). This test method uses three-point loading for measurement of creep in flexure. The support span fixture was attached to the base of a flat bottom round glass container and situated directly below the loading anvil attached to the Instron, as shown in FIG. 1B. The support span distance was 0.600 inches. Test specimens measured 1 inch in width, 2 inches in length, and 0.030 inches in thickness. The glass container was filed with distilled water and covered with a plastic lid. The water was heated with the surrounding heater bands and the temperature was regulated to 37° C. A test specimen was laid flat across the support span. Then, a pre-determined load was applied to the test specimen at a rate to ensure load delivery within five seconds (e.g. 150 lbs/min. for a 12 lb load). A constant deflection was maintained at 5% strain and load decay was monitored over a 24 hour period. Compressive load data was collected every ten seconds. Percent stress relaxation was determined as described above.

2. Percent Moisture Uptake

Percent moisture uptake was determined by drying a polymer sample having a thickness of 0.76 mm and determining an initial dry weight of the polymer sample. The dried sample was then immersed in water at 20° C.+/−2° C. for 24 hours, removed from the water, and the weight gain of the sample was taken. The percent moisture uptake was calculated from the equation:

% moisture uptake= (weight gain/initial dry weight)*100

This method is rapid and serves to provide an indication of relative moisture uptake, the polymer samples may not be at an equilibrium moisture uptake after 24 hours. It will be appreciated that the period of time in which the sample is placed in the water can be increased, and periodic weight gain measurements can be taken until the moisture level is seen to reach a steady state value, if an equilibrium moisture uptake value is desired.

3. Glass Transition Temperature

Glass transition (Tg) temperatures were determined using a differential scanning calorimeter standardized with indium and deionized water. "As is" or "dry" glass transition temperatures were determined on polymers stored at ambient conditions of temperature and humidity. A 5-7 mg sample size was placed in the DSC pan and treated to a "first heat" to about 180° C. which was held for 3 minutes, a cool down at 10° C./min. to 20° C. which was held for 3 minutes, followed by heat up at 10° C./min. to 180° C. to provide a "second heat" heat flow vs. temperature curve from which the glass transition was obtained. The "dry" or "as is" Tg values reported are midpoint values of the transition of the first heat. "Wet" glass transition (TgW) values were determined on polymer samples that had been immersed in water at 20° C.+/−2° C.

for 24 hours. A 5-7 mg sample size was placed in the DSC pan and treated to a "first heat" to about 18° C.; the wet glass transition temperature is reported as the midpoint value for the transition of the first heat.

Example 1

Glass Transition Temperatures of Polyurethane and Polymethylmethacrylate Polymer Articles The following thermoplastic polyurethanes were obtained: Isoplast® 2530, Isoplast® 2531, and Isoplast® 302EZ, (Dow Chemical); Estane® X-4995, Estane® X-1138, Estane® X-1172, Estane® X-1173, and Estane® X-1140 (Noveon); and polymethylmethacrylate (PMMA). Test articles were prepared from the polymers as follows:

1. Extruded: Test articles comprised of the polyurethanes Noveon® X-4995 and Isoplast® 2530 consisted of samples taken from extruded sheets of the polyurethanes. The extruded sheets were placed on a flat surface in an oven at 90° C. for five minutes for flattening. Then, a test sample measuring 1.9"×2.5"×0.030" was punched with a die.

2. Pressed pellets: Polymer articles comprised of the polyurethanes Isoplast® 2531 and Isoplast® 302EZ, were prepared from pre-dried pellets, pressed on a hot press at 232° C. (450° F.) into a 30 mil sheet. The sheet was set aside for 24 hours prior to use in any subsequent operations, such as annealing, to ensure completion of any recombination reactions.

3. Pressed down thick sheets: Injection-molded, 0.125 inch thick tensile bars comprised of the polyurethane Noveon® in the grades designated as X-4995, X-1138, X-1172, X-1173 and X-1140 were dried, and pressed at 232° C. (450° F.) into 0.035"-0.037" sheets. These manufacturer reported nominal Tg values of the grades, respectively, is 100° C., 110° C., 120° C., 130° C. and 140° C. Test samples measuring 1.9"×2.5"× 0.030" were punched with a die.

Test samples of PMMA were taken from a 0.060" thick PMMA sheets. The sheets were dried and pressed into 0.030" sheets in a hot press at 221° C. (430° F.). Test samples measuring 1.9"×2.5"×0.030" were punched with a die.

A. Dry or "As Is" Glass Transition Temperatures

The "as is" or "dry" glass transition temperatures (TgD) of the polymers were determined by DSC according to the method provided above. Examplary DSC scans for Isoplast® 2530 and for Estane® X-4995 are shown in FIGS. 2A-2B, respectively. The dry glass transitions corresponding to the midpoint of the transition of the second heat were 92° C. for Isoplast® 2530 (FIG. 2A) and 94° C. for Estane® X-4995 (FIG. 2B). The TgD values for all samples are shown in Table A.

B. "Wet" Glass Transition Temperatures

To determine a "wet" glass transition (TgW), samples of each polymer were immersed in water at 20° C.+/−2° C. for 24 hours. The hydrated samples were then placed in a DSC pan and the "wet" glass transition temperatures determined by DSC according to the method provided above. Exemplary DSC scans for Isoplast® 2530 and for Estane® X-4995 are shown in FIGS. 2C-2D. The wet glass transition temperatures, corresponding to the midpoint of the first heat, were 77° C. for Isoplast® 2530 (FIG. 2C) and 78-81° C. for Estane® X-4995 (FIG. 2D). The TgW values for all samples are shown in Table A.

TABLE A

Dry and Wet Glass Transition Temperatures of Exemplary Polymers

| Polymer Article Composition | TgD (° C.) | TgW (° C.) |
|---|---|---|
| Polyurethane Estane ® X-4995 | 98 | 81 |
| Polyurethane Estane ® X-1138 | 110 | 98 |
| Polyurethane Estane ® X-1172 | 114 | 104 |
| Polyurethane Estane ® X-1173 | 128 | 115 |
| Polyurethane Estane ® X-1140 | 121 | 111 |
| Polyurethane Isoplast ® X-2530 | 92 | 77 |
| Polyurethane Isoplast ® X-2531 | 108 | 95 |
| Polyurethane Isoplast ® 302EZ | 135 | 124 |
| PMMA | 106 | 92 |

For ease of reference, the various grades of the polyurethane Estane ® are sometimes referred to herein by the TgD values: Estane ® (TgD 98° C.), Estane ® (TgD 110° C.), Estane ® (TgD 114° C.), Estane ® (TgD 128° C.), Estane ® (TgD 121° C.).

Comparative Example 1

The polymer films were treated by heating at 115° C. (23° C. and 21° C. above the dry glass transition temperatures, see Example 1) for 16 hours. After 16 hours the samples were placed in a plastic bag containing water and maintained at 37° C. for 24 hours and then tested for stress relaxation according to the method described above. The stress relaxation of samples not subjected to the heating was measured as a control. The results are shown below.

| | Stress Relaxation (%) | | | |
|---|---|---|---|---|
| Time (hours) | Polyurethane Isoplast ® 2530 Untreated | Polyurethane Isoplast ® 2530 Annealed (16 hours, 115° C.) | Polyurethane Estane ® X-4995 Untreated | Polyurethane Estane ® X-4995 Annealed (16 hours, 115° C.) |
| 0 | 0 | 0 | 0 | 0 |
| 0.5 | 19.9 | 22.5 | 22.1 | 31.3 |
| 1 | 25.5 | 28.2 | 27.0 | 37.5 |
| 4 | 39.1 | 40.8 | 39.2 | 50.5 |
| 8 | 47.7 | 47.4 | 45.5 | 56.6 |
| 12 | 52.2 | 51.8 | 49.5 | 60.3 |
| 16 | 56.0 | 55.2 | 52.8 | 63.1 |
| 20 | 58.7 | 57.6 | 54.7 | 65.4 |
| 24 | 60.8 | 59.3 | 56.7 | 66.7 |

The untreated (i.e., unannealed) polyurethane samples had about 57-61% stress relaxation at the 24 hours time point. Thermal treatment of the polyurethanes by heating above the dry glass transition temperature did not improve stress relaxation since the annealed samples had 59-67% stress relaxation at the 24 hour time point.

Example 2

Rigid polyurethanes (Estane® X4995 and Isoplast® 2530) were extruded into 0.76 mm thick sheets and aged at ambient conditions for 72 hours. Samples of the extruded sheet were subjected to varying thermal processes, as indicated in the table below, and then the stress relaxation properties and creep modulus were measured.

Thermal Treatment Conditions

| Test No. | Polyurethane Trade Name | Temperature °C. | Humidity (%) | Time (hours) |
|---|---|---|---|---|
| 1 | Estane ® X-4995 | 22 | 45-50 | 24 |
| 2 | Isoplast ® 2530 | 22 | 45-50 | 24 |
| 3 | Estane ® X-4995 | 60 | — | 24 |
| 4 | Estane ® X-4995 | 60 | 100 | 24 |
| 5 | Isoplast ® 2530 | 115 | <5 | 16 |
| 6 | Estane ® X-4995 | 115 | <5 | 16 |
| 7 | Estane ® X-4995 | 80 | <5 | 24 |

Stress relaxation of the samples was measured according to the method described above, where the stress relaxation tests were conducted at approximately 5% strain at 37° C. and 95% relative humidity. The results are shown in Table B. The data is presented graphically in FIG. 3.

TABLE B

| Time hrs | Sample 1 | Sample 2 | Sample 3 | Sample 4 | Sample 5 | Sample 6 | Sample 7 |
|---|---|---|---|---|---|---|---|
| 0.0 | 0 | 0 | 0 | 0 | 0 | 0 | 0 |
| 0.5 | 20 | 20 | 24 | 13 | 22 | 31 | 17 |
| 1.0 | 25 | 25 | 28 | 15 | 28 | 37 | 22 |
| 4.0 | 37 | 39 | 39 | 19 | 41 | 50 | 30 |
| 8.0 | 43 | 48 | 45 | 21 | 47 | 57 | 36 |
| 12.0 | 47 | 52 | 49 | 21 | 52 | 60 | 39 |
| 16.0 | 50 | 56 | 52 | 22 | 55 | 63 | 41 |
| 20.0 | 53 | 59 | 53 | 22 | 58 | 65 | 43 |
| 24.0 | 54 | 61 | 55 | 22 | 59 | 67 | 44 |

Example 3

A sample of the polyurethane polymer Estane® X-4995, having a dry glass transition temperature of 94° C. (determined by DSC, as described above), was heated 80° C. for 24 hours. A second sample was heated at 80° C. for 24 hours and then cooled to −10° C. for 24 hours. Both samples were then tested for stress relaxation over a 24 hour period and compared to a control sample that had not been heat treated. The results are shown in Table 1.

Example 4

Samples of the polyurethanes Estane® X-4995-030 and Isoplast® 2530 were heated to 80° C. for 67 hours or to 90° C. for 18 hours. After heating, the samples were immersed in water at 37° C. for 24 hours. Stress relaxation was measured under a 5% strain and at 37° C. at 95% relative humidity. Control samples that were not heat treated were subjected to identical post-heating treatment and tested for stress relaxation under identical conditions. The results are shown graphically in FIGS. 4A-4E and summarized in Tables C-E below.

TABLE C

| | Stress Relaxation (%) | | | | |
|---|---|---|---|---|---|
| | Estane ® X-4995 | | | | Isoplast ® |
| Hours | 1 | 2 | 3 | 4 | 2530 |
| 0.0 | 0.0 | 0.0 | 0.0 | 0.0 | 0.0 |
| 0.1 | 12.6 | 9.3 | 13.5 | 10.0 | 19.2 |
| 0.5 | 30.0 | 26.8 | 31.3 | 25.6 | 40.9 |
| 1.0 | 37.0 | 34.2 | 38.1 | 32.6 | 49.2 |
| 4.0 | 51.2 | 49.3 | 51.5 | 47.4 | 64.6 |
| 8.0 | 58.4 | 56.8 | 58.3 | 55.1 | 71.6 |
| 12.0 | 62.4 | 60.9 | 62.2 | 59.8 | 75.3 |
| 16.0 | 65.2 | 63.6 | 64.9 | 63.2 | 77.8 |
| 20.0 | 67.3 | 65.6 | 66.9 | 65.8 | 79.7 |
| 24.0 | 69.0 | 67.2 | 68.6 | 68.0 | 81.1 |

TABLE D

| | Stress Relaxation (%) | | | | |
|---|---|---|---|---|---|
| | Estane ® X-4995 | | | | Isoplast ® |
| Hours | 1 | 2 | 3 | 4 | 2530 |
| 0.0 | 0.0 | 0.0 | 0.0 | 0.0 | 0.0 |
| 0.1 | 11.7 | 14.8 | 19.1 | 15.3 | 12.4 |
| 0.5 | 26.1 | 29.9 | 34.4 | 30.6 | 30.7 |
| 1.0 | 32.6 | 35.8 | 40.6 | 36.9 | 37.9 |
| 4.0 | 45.8 | 48.6 | 52.4 | 50.3 | 52.8 |
| 8.0 | 52.0 | 54.3 | 58.3 | 57.2 | 60.0 |
| 12.0 | 56.0 | 58.0 | 61.6 | 60.9 | 64.3 |

TABLE D-continued

| | Stress Relaxation (%) | | | | |
|---|---|---|---|---|---|
| | Estane ® X-4995 | | | | Isoplast ® |
| Hours | 1 | 2 | 3 | 4 | 2530 |
| 16.0 | 59.2 | 60.9 | 63.8 | 63.9 | 67.0 |
| 20.0 | 61.1 | 62.6 | 65.6 | 66.0 | 69.0 |
| 24.0 | 62.5 | 64.2 | 67.1 | 67.9 | 70.9 |

TABLE E

| | Stress Relaxation (%) | | | | |
|---|---|---|---|---|---|
| | Estane ® X-4995 | | | | Isoplast ® |
| Hours | 1 | 2 | 3 | 4 | 2530 |
| 0.0 | 0.00 | 0.00 | 0.00 | 0.00 | 0.00 |
| 0.5 | 19.24 | 19.22 | 24.90 | 26.13 | 22.14 |
| 1.0 | 23.05 | 22.25 | 28.94 | 30.32 | 25.91 |
| 4.0 | 32.96 | 32.40 | 38.53 | 42.33 | 36.44 |

TABLE E-continued

| | Stress Relaxation (%) | | | | |
|---|---|---|---|---|---|
| | Estane ® X-4995 | | | | Isoplast ® |
| Hours | 1 | 2 | 3 | 4 | 2530 |
| 8.0 | 38.57 | 37.56 | 43.47 | 48.41 | 41.73 |
| 12.0 | 42.11 | 41.47 | 46.49 | 52.60 | 45.82 |
| 16.0 | 44.31 | 43.87 | 48.50 | 55.13 | 48.44 |
| 20.0 | 46.44 | 46.12 | 50.26 | 57.11 | 50.48 |
| 24.0 | 48.10 | 47.51 | 51.75 | 58.22 | 51.95 |

Example 5

Samples of the polyurethane Estane® X-4995-030 were heated to 80° C. for 64 hours. After heating, the samples were immersed in water at 37° C. for 24 hours. Stress relaxation was measured according to the method provided above at strain rates of 1.4%, 2.3%, 2.9%, 4.0%, and 4.8%, at 37° C. at 95% relative humidity. The results are shown in FIG. 5.

Example 6

Samples of the polyurethane Estane® XA995-030 were heated to 80° C. for 96 hours. Control samples remained at room temperature for 96 hours. After heating, the samples were immersed in water at 37° C. for 24 hours. Stress relaxation of the samples was measured immediately after the 96 hour heating period, and at 5, 14, and 28 days after the heating period. Stress relaxation was measured according to the method provided above at a 5% strain rate and at 37° C. at 95% relative humidity. The results are shown in FIG. 6.

Example 7

Samples of the polyurethane Estane® X-4995-030, previously extruded into a film having a thickness of 0.76 mm were dried at 90° C. for 10 hours. The films were thermoformed into orthodontic appliances using rigid molds prepared from a negative impression of a human mouth. The molds were prepared by taking a dental impression using a two part silicone polymer (negative impression) and then creating a positive casting using plaster of paris. The casting served as the male mold for thermoforming.

The orthodontic appliances were prepared by placing a dried sheet of polyurethane over the positive mold, heating the polyurethane above it's glass transition temperature to approximately 150° C. and then pressure forming the sheet over the mold.

After thermoforming, the articles were heated at 80° C. for 24 hours in a dry environment. After the 24 hour heat treatment period, the samples were immersed in water at 37° C. for 24 hours. The appliances were then subjected to a deformation of 5% while being maintained at 37° C. and 100% relative humidity for 24 hours. After the 24 hour deformation test the deformation was released and the appliances were compared to the plaster of paris mold. The appliances that were annealed were significantly less deformed.

Example 8

Samples of the polyurethane polymer Estane® X-4995-030, previously extruded into a film having a thickness of 0.76 mm, were heat treated in dry or wet environment having a relative humidity of <5% and 100%, respectively, for the indicated times and temperatures. Two samples, identified as sample nos. 12 and 14, were subjected to heating initially in a dry environment, followed by heating in a wet environment.

| Sample No. | Time | Temperature |
|---|---|---|
| 8 (control) | — | — |
| 9 | 168 hours (7 days) | 30° C. |
| 10 | 168 hours | 37° C. |
| 11 | 168 hours | 60° C. |
| 12 | dry: 24 hours | dry: 80° C. |
| | wet: 168 hours | wet: 60° C. |
| 13 | 24 hours | 60° C. |
| 14 | dry: 24 hours | dry: 85° C. |
| | wet: 24 hours | wet: 60° C. |

Stress relaxation of samples 8-14 was measured after the heat treatment according to the procedure described in the methods section above. The results are shown in FIGS. 8A-8B.

Example 9

Samples of the polyurethane Estane® X-4995-030, previously extruded into a film having a thickness of 0.76 mm, were heat treated for 24 hours in a wet environment having a relative humidity of 100% and having a temperature of 60° C., 70° C., or 80° C. Stress relaxation was measured according to the method provided above at a 5% strain rate and at 37° C. at 95% relative humidity. The results are summarized in Table F and shown graphically in FIG. 9.

TABLE F

| Time hrs | unmodified | wet-annealed at 60° C./24 hr | wet-annealed at 70° C./24 hr | wet-annealed at 80° C./24 hr |
|---|---|---|---|---|
| 0.0 | 0.0 | 0.0 | 0.0 | 0.0 |
| 0.5 | 22.36 | 15.11 | 20.2 | 21.2 |
| 1.0 | 27.13 | 17.38 | 23.6 | 24.6 |
| 4.0 | 39.61 | 23.48 | 30.4 | 31.3 |
| 8.0 | 46.32 | 25.89 | 32.8 | 35.1 |
| 12.0 | 51.13 | 27.16 | 34.8 | 37.6 |
| 16.0 | 53.88 | 28.22 | 36.1 | 38.9 |
| 20.0 | 55.85 | 29.08 | 36.7 | 39.5 |
| 24.0 | 57.94 | 29.21 | 37.8 | 40.6 |

Example 10

Polymer articles composed of the various polymers noted in Example 1 were prepared. The articles were subjected to varying thermal processes, as indicated in the table below. Samples were dry annealed at the indicated temperature for the indicated period of time in a chamber with a controlled environment having a relative humidity of typically less than 10%, more generally less than 5%. Samples were wet annealed at the indicated temperature for the indicated period of time in an environment saturated with water, i.e., having a relative humidity of greater than at least about 90%, more typically 95%.

Thermal Treatment Conditions

| Polymer Article Composition | TgD (° C.) | TgW (° C.) | Wet-Anneal (100% humidity) | Dry-Anneal |
|---|---|---|---|---|
| Estane ® X-4995 | 98 | 81 | 65° C./24 hr | not done |
| Estane ® X-1138 | 110 | 98 | 80° C./24 hr | not done |
| Estane ® X-1172 | 114 | 104 | 80° C./24 hr | not done |
| Estane ® X-1173 | 128 | 115 | 80° C./24 hr | not done |

-continued

| Polymer Article Composition | TgD (° C.) | TgW (° C.) | Wet-Anneal (100% humidity) | Dry-Anneal |
|---|---|---|---|---|
| Estane ® X-1140 | 121 | 111 | 80° C./24 hr | not done |
| Isoplast ® X-2530 | 93 | 77 | 60° C./24 hr | 80° C./48 hr |
| Isoplast ® X-2531 | 108 | 84 | 65° C./24 hr | 80° C./48 hr |
| Isoplast ® 302 EZ | 135 | 124 | 80° C./24 hr | not done |
| PMMA | 106 | 92 | 75° C./24 hr | 85° C./24 hr |

After thermal treatment, stress relaxation of the samples was measured according to the method described above, where the stress relaxation tests were conducted at approximately 5% strain at 37° C. and 95% relative humidity. The results are shown in Table G and in FIGS. 10, 11, and 12A-13C.

TABLE G

Stress Relaxation Data of Polymer Articles Untreated and Annealed

| Property | Isoplast ® 2530 | Isoplast ® 2531 | PMMA | Estane ® X-4995 | Estane ® X-1138 | Estane ® X-1172 | Estane ® X-1173 | Estane ® X-1140 |
|---|---|---|---|---|---|---|---|---|
| Tg (nominal) ° C. | 93° C. | 109° C. | 106° C. | 100° C. | 110° C. | 120° C. | 130° C. | 140° C. |
| TgD (dry) ° C. | — | 108° C. | 104° C. | 98° C. | 110° C. | 114° C. | 127° C. | 121° C. |
| TgW (wet) ° C. | 77 | | 102° C. | 81° C. | 98° C. | 104° C. | 115° C. | 111° C. |
| Dry annealing Temp. (48 hrs, ° C.) | 80 | 80° C. | 85° C. | 80° C. | 95° C. | 95° C. | 105° C. | 105° C. |
| Wet annealing Temp. (24 hrs, ° C.) | 60 | 65° C. | 75° C. | 65° C. | 80° C. | 80° C. | 80° C. | 80° C. |
| SR %: unmodified | 51.3% | 51.0 | 54.1 | 54 | 51.8 | 50.2 | 45.8 | 44.6 |
| SR %: wet-annealed | 42.2% | 17.8 | 29.2 | 32.4 | 26.2 | 28.8 | 22.5 | 20.7 |
| SR %: dry-annealed | 48.0% | 36.8 | 35.7 | | | | | |

Example 11

A. Determine Percent Moisture Uptake

Samples of polycarbonate (Lexan®), of the polyurethanes Isoplast® 2530 (Dow Chemical) and Estane® X-4995 (Noveon), and of the polyamides Selar® 3426 (Dupont), Grilamid® TR55 (EMS Chemie), Grilamid® TR90 (EMS Chemie), and Trogamid® T5000 (Degussa), and of the polyester Eastar 6763 (Eastman) were obtained and weighed. After the initial weights were recorded, the samples were immersed in water at room temperature (about 20° C.). The moisture uptake of the polymers as a function of time was determined by weighing the samples after 1, 4, 8, 24, 31, 96, and 168 hours of immersion. Percent moisture uptake was calculated from the initial and final weights at each time point. The results are shown in Table H and are presented graphically in FIG. 13.

TABLE H

| Time hrs | Isoplast ® 2530 | Noveon ® X-4995 | Selar ® PA 3426 | Grilamid ® TR55 | Grilamid ® TR90 | Trogamid ® T5000 | Eastar ® 6763 | Lexan ® 148-112 |
|---|---|---|---|---|---|---|---|---|
| 0 | 0 | 0 | 0 | 0 | 0 | 0 | 0 | 0 |
| 1 | 0.139 | 0.1298 | 0.3309 | 0.1962 | 0.2796 | 0.1522 | 0.1887 | 0.0635 |
| 4 | 0.2134 | 0.2371 | 0.7486 | 0.5959 | 0.6133 | 0.4639 | 0.2819 | 0.1473 |
| 8 | 0.4927 | 0.4737 | 1.0581 | 0.9254 | 0.7641 | 0.8595 | 0.3834 | 0.321 |
| 24 | 0.7339 | 0.7338 | 1.8631 | 1.6061 | 1.3268 | 1.3044 | 0.6066 | 0.3815 |
| 31 | 0.7408 | 0.6964 | 2.066 | 1.699 | — | 1.6353 | — | 0.3517 |
| 96 | 1.2041 | 1.1634 | 3.6233 | 2.7611 | — | 2.9666 | — | 0.3368 |
| 168 | 1.5082 | 1.3939 | 5.0187 | 3.3150 | 2.6154 | | 0.7726 | 0.3441 |

B. Determine Wet and Dry Glass Transition Temperatures

The glass transition temperatures of the polymer samples before (TgD) and after hydration in water at 37° C. for 24 hours (TgW) were determined by DSC. The DSC scans are shown in FIGS. 18A-18D for hydrated samples of polycarbonate (Lexan®) and of the polyamides Selar® 3426, Grilamid® TR55, and Trogamid® T5000. Table I summarizes the dry and wet glass transition values for the polymer samples.

TABLE I

Dry Glass Transition Values and Wet Glass Transition Values

|  | Isoplast® 2530 | Noveon® X-4995 | Selar® PA 3426 | Grilamid® TR55 | Grilamid® TR90 | Trogamid® T5000 | Lexan® 104-112 | Eastar® 6763 |
|---|---|---|---|---|---|---|---|---|
| TgD 22° C./50% RH/24 hr | 93° C. | 95° C. | 124° C. | 158° C. | 150° C. | 142° C. | 150° C. | 80° C. |
| TgW 22° C./H$_2$O/24 hr | 77° C. | 80° C. | 93° C. | 126° C. | 139° C. | 108° C. | 149° C. | 76° C. |

C. Dry and Wet Heat Treatment and Stress Relaxation

The stress relaxation of the rigid, amorphous polymer articles was measured in both a wet (95% RH) and dry (50% RH) test atmosphere, after the article was subjected to one of the following treatment conditions:

(1) no treatment, control;
(2) dry annealing at about 15° C. below TgD for 25 hours; or
(3) wet annealing (polymer sample placed in excess liquid water) at about 15° C. below TgW for 24 hours.

After the heat treatment, the polymer article was prepared for stress relaxation evaluation by subjecting the article to one of two preconditioning regimens: (1) 24 hours at 22° C. (room temperature); or (2) 37° C. in water for 24 hours. After the preconditioning period, stress relaxation was measured at either 50% relative humidity (RH) or at 95% RH. The results are summarized in Table J and presented in FIGS. 19A-19H.

TABLE J

Stress Relaxation (%) of various rigid, amorphous polymer tested at 37° C. under dry (50% RH) or high humidity (95% RH) environments

| Trade name Grade | Isoplast® 2530 | Noveon® X-4995 | Selar® 3426 | Grilamid® TR55 | Trogamid® T5000 | Lexan® 104-112 | Grilamid® TR90 | Eastar® 6763 |
|---|---|---|---|---|---|---|---|---|
| Dry-annealing temperature, ° C. | 80 | 80 | 109 | 125 | 125 | 125 | 125 | 65 |
| Wet annealing temperature, ° C. | 60 | 60 | 80 | 80 | 80 | 80 | 80 | 60 |
| Dry Stress Relaxation[1] (37° C./50% RH) | | | | | | | | |
| Control | 52.1 | 51.8 | 56.1 | 50.2 | 51.4 | 17.8 | 47.4 | 61.5 |
| Dry-annealed | 28.3 | 31.2 | 44.1 | 38.0 | 42.0 | 9.8 | 33.7 | 27.6 |
| Wet Stress Relaxation[2] (37° C./195% RH) | | | | | | | | |
| Control | 55.8 | 63.3 | 85.9 | 58.2 | 71.1 | 19.6 | 47.4 | 54.7 |
| Dry-annealed | 48.0 | 47.8 | 85.2 | 49.5 | 63.0 | 8.9 | 40.6 | 45.8 |
| Wet-annealed | 42.2 | 29.1 | 80.0 | 13.4 | 32.6 | 9..8 | 8.8 | 39.8 |

[1]Test specimens pre-conditioned at 22° C./50% RH/24 hrs prior to stress relaxation test.
[2]Test specimens pre-conditioned at 37° C./H$_2$O/24 hrs prior to stress relaxation test.

The data presented graphically in FIGS. 19A-19H is summarized in Tables K-R and in FIGS. 20A-20B.

TABLE K

Stress Relaxation of Isoplast® 2530

| Time hrs | Unmodified tested 37° C./50% RH | Unmodified tested 37° C./95% RH | Dry annealed tested 37° C./50% RH | Wet annealed tested 37° C./95% RH | Dry annealed tested 37° C./95% RH |
|---|---|---|---|---|---|
| 0.0 | 0.0 | 0.0 | 0.0 | 0.0 | 0.0 |
| 0.1 | 10.3 | 11.5 | 6.4 | 10.3 | 9.6 |

TABLE K-continued

Stress Relaxation of Isoplast ® 2530

| Time hrs | Unmodified tested 37° C./50% RH | Unmodified tested 37° C./95% RH | Dry annealed tested 37° C./50% RH | Wet annealed tested 37° C./95% RH | Dry annealed tested 37° C./95% RH |
|---|---|---|---|---|---|
| 0.5 | 18.4 | 21.2 | 11.0 | 18.6 | 18.1 |
| 1.0 | 23.1 | 26.2 | 13.4 | 22.9 | 22.6 |
| 4.0 | 33.9 | 38.5 | 18.8 | 31.5 | 32.5 |
| 8.0 | 40.4 | 45.1 | 22.2 | 35.9 | 38.2 |
| 12.0 | 44.5 | 48.7 | 24.5 | 38.4 | 41.8 |
| 16.0 | 47.6 | 51.6 | 26.1 | 40.2 | 44.1 |
| 20.0 | 50.1 | 54.0 | 27.2 | 41.2 | 46.1 |
| 24.0 | 52.1 | 55.8 | 28.3 | 42.2 | 48.0 |

TABLE L

Stress Relaxation of Noveon ® X-4995 Estane ®

| Time hrs | Unmodified tested 37° C./50% RH | Unmodified tested 37° C./95% RH | Dry annealed, tested 37° C./50% RH | Wet annealed, tested 37° C./95% RH | Dry annealed, tested 37° C./95% RH |
|---|---|---|---|---|---|
| 0.0 | 0.0 | 0.0 | 0.0 | 0.0 | 0.0 |
| 0.1 | 7.5 | 20.5 | 5.9 | 7.6 | 8.6 |
| 0.5 | 12.7 | 31.8 | 10.6 | 13.0 | 16.2 |
| 1.0 | 16.5 | 37.0 | 13.2 | 16.0 | 20.4 |
| 4.0 | 26.7 | 48.6 | 19.8 | 21.7 | 30.1 |
| 8.0 | 34.7 | 53.9 | 24.0 | 24.4 | 36.4 |
| 12.0 | 40.3 | 57.3 | 26.2 | 26.1 | 40.7 |
| 16.0 | 45.0 | 60.0 | 28.4 | 27.7 | 43.3 |
| 20.0 | 48.6 | 61.9 | 29.9 | 28.3 | 45.7 |
| 24.0 | 51.8 | 63.3 | 31.2 | 29.1 | 47.8 |

TABLE M

Stress Relaxation of Grilamid ® TR55, polyamide

| Time hrs | Unmodified tested 37° C./50% RH | Unmodified tested 37° C./95% RH | 125° C. annealed tested 37° C./50% RH | Wet annealed 80° C., tested 37° C./95% RH | 125° C. annealed tested 37° C./95% RH |
|---|---|---|---|---|---|
| 0.0 | 0 | 0.0 | 0.0 | 0.0 | 0.0 |
| 0.1 | 7.37 | 13.7 | 5.5 | 5.2 | 11.2 |
| 0.5 | 14.11 | 24.1 | 11.1 | 8.0 | 19.7 |
| 1.0 | 18.56 | 29.0 | 14.3 | 9.0 | 23.8 |
| 4.0 | 29.52 | 41.0 | 23.4 | 10.8 | 33.8 |
| 8.0 | 36.77 | 47.1 | 29.6 | 11.7 | 39.5 |
| 12.0 | 41.51 | 51.2 | 33.4 | 12.3 | 43.4 |
| 16.0 | 45.1 | 54.3 | 35.4 | 12.8 | 45.6 |
| 20.0 | 47.85 | 56.4 | 36.5 | 13.0 | 47.7 |
| 24.0 | 50.15 | 58.2 | 38.0 | 13.4 | 49.5 |

TABLE N

Stress Relaxation of Grilamid ® TR90, polyamide

| Time hrs | Unmodified tested 37° C./50% RH | Unmodified tested 37° C./95% RH | 125° C. annealed tested at 37° C./50% RH | Wet annealed 80° C., tested 37° C./95% RH | 125° C. annealed tested 37° C./95% RH |
|---|---|---|---|---|---|
| 0.0 | 0.0 | 0.0 | 0.0 | 0.0 | 0 |
| 0.1 | 10.4 | 12.5 | 5.9 | 7.5 | 9.1 |
| 0.5 | 17.2 | 20.5 | 10.4 | 9.1 | 15.9 |
| 1.0 | 21.2 | 24.0 | 13.3 | 9.5 | 19.7 |
| 4.0 | 31.4 | 33.7 | 20.4 | 10.5 | 27.8 |
| 8.0 | 37.4 | 38.6 | 26.0 | 9.9 | 32.6 |
| 12.0 | 41.4 | 41.6 | 29.3 | 9.6 | 35.6 |
| 16.0 | 44.4 | 44.0 | 31.3 | 9.2 | 37.4 |
| 20.0 | 46.1 | 45.9 | 32.3 | 9.3 | 39.1 |
| 24.0 | 47.4 | 47.3 | 33.7 | 8.8 | 40.6 |

TABLE O

Stress Relaxation of Selar ® PA 3426, Polyamide

| Time hrs | Unmodified, tested at 37° C./50% RH | Unmodified; tested at 37° C./95% RH | 109° C. dry annealed; tested at 37° C./50% RH | Wet annealed 80° C., tested 37° C./95% RH | 109° C. dry annealed; tested 37° C./95% RH |
|---|---|---|---|---|---|
| 0.0 | 0 | 0.0 | 0.00 | 0.0 | 0.00 |
| 0.1 | 5.74 | 22.6 | 8.95 | 54.6 | 28.34 |
| 0.5 | 11.57 | 36.1 | 13.96 | 69.2 | 44.86 |
| 1.0 | 15.81 | 41.5 | 16.71 | 72.0 | 50.60 |
| 4.0 | 27.91 | 57.0 | 23.83 | 76.9 | 63.03 |
| 8.0 | 37.33 | 68.2 | 30.10 | 78.1 | 70.42 |
| 12.0 | 43.7 | 76.6 | 35.03 | 78.9 | 75.25 |
| 16.0 | 48.54 | 81.4 | 38.67 | 79.2 | 81.15 |
| 20.0 | 52.68 | 83.9 | 41.64 | 79.8 | 83.82 |
| 24.0 | 56.14 | 85.9 | 44.13 | 80.0 | 85.24 |

TABLE P

Stress Relaxation of Trogamid T5000, polyamide

| Time hrs | Unmodified tested 37° C./50% RH | Unmodified tested 37° C./95% RH | 125° C. annealed tested 37° C./50% RH | Wet annealed 80° C., tested 37° C./95% RH | 125° C. annealed tested 37° C./95% RH |
|---|---|---|---|---|---|
| 0.0 | 0.0 | 0.0 | 0.0 | 0.0 | 0.0 |
| 0.1 | 7.1 | 23.5 | 5.1 | 11.2 | 18.9 |
| 0.5 | 13.0 | 34.1 | 9.5 | 19.1 | 29.6 |
| 1.0 | 17.1 | 38.5 | 12.7 | 21.7 | 34.2 |
| 4.0 | 27.9 | 51.2 | 21.8 | 26.1 | 44.9 |
| 8.0 | 35.9 | 59.7 | 28.7 | 28.5 | 51.7 |
| 12.0 | 41.4 | 64.1 | 33.4 | 30.1 | 55.8 |
| 16.0 | 45.9 | 67.2 | 37.0 | 31.3 | 58.7 |
| 20.0 | 49.1 | 69.4 | 39.5 | 32.0 | 60.9 |
| 24.0 | 51.4 | 71.1 | 42.0 | 32.6 | 63.0 |

TABLE Q

Stress Relaxation of Eastar 6763, PETG

| Time hrs | Unmodified tested 37° C./50% RH | Unmodified tested 37° C./95% RH | 65° C. annealed tested 37° C./50% RH | Wet annealed 60° C., tested 37° C./95% RH | 65° C. annealed tested 37° C./95% RH |
|---|---|---|---|---|---|
| 0.0 | 0.0 | 0.00 | 0.00 | 0.0 | 0.0 |
| 0.1 | 17.8 | 12.62 | 6.59 | 10.3 | 13.4 |
| 0.5 | 29.2 | 22.26 | 11.00 | 16.9 | 22.2 |
| 1.0 | 35.1 | 26.81 | 13.91 | 20.6 | 26.2 |
| 4.0 | 47.1 | 38.69 | 19.06 | 28.8 | 33.7 |
| 8.0 | 52.7 | 44.63 | 22.03 | 32.7 | 38.1 |
| 12.0 | 56.2 | 48.27 | 24.38 | 35.5 | 41.3 |
| 16.0 | 58.9 | 51.14 | 25.63 | 37.2 | 43.1 |
| 20.0 | 60.4 | 53.21 | 26.52 | 38.4 | 44.9 |
| 24.0 | 61.5 | 54.70 | 27.56 | 39.8 | 45.8 |

TABLE R

Stress Relaxation of Lexan 104-112, polycarbonate

| Time hrs | Unmodified tested 37° C./50% RH | Unmodified tested 37° C./95% RH | 125° C. annealed tested 37° C./50% RH | Wet annealed 80° C., tested 37° C./95% RH | 125° C. annealed tested 37° C./95% RH |
|---|---|---|---|---|---|
| 0.0 | 0.0 | 0.0 | 0.0 | 0.0 | 0.0 |
| 0.1 | 6.5 | 8.1 | 2.8 | 3.5 | 3.5 |
| 0.5 | 10.2 | 11.0 | 4.6 | 5.2 | 4.7 |
| 1.0 | 12.2 | 12.1 | 6.3 | 6.1 | 5.3 |
| 4.0 | 16.2 | 14.3 | 8.0 | 6.8 | 5.4 |
| 8.0 | 16.8 | 15.3 | 8.7 | 7.8 | 5.5 |
| 12.0 | 17.4 | 16.3 | 9.3 | 8.4 | 6.2 |
| 16.0 | 17.8 | 17.6 | 9.4 | 9.1 | 6.8 |
| 20.0 | 17.9 | 18.5 | 9.3 | 9.4 | 7.7 |
| 24.0 | 17.8 | 19.6 | 9.8 | 9.8 | 8.9 |

Example 12

Wet Annealing of Polyurethane at

Polymeric articles were prepared from the polyurethanes Isoplast® 2530 (Dow Chemical) and Estane® X-4995 (Noveon). The articles were placed in liquid water at either (1) 22° C. for 72 hours or (2) 60° C. for 24 hours (wet-annealing). Under both conditions, the polymer articles absorbed approximately 1% (wt) water, determined by weight uptake. Wet glass transition temperatures were measured by DSC. Stress relaxation of the articles was then tested at 37° C., 95% RH under 5% strain for 24 hours. The results are shown in Table S.

TABLE S

Stress Relaxtion of Polyurethane at 1% Moisture Uptake

|  | Estane ® X-4995; Control | Estane ® X-4995; 22° C./72 hr | Estane ® X-4995; wet annealed 60° C./24 hr | Isoplast ® 2530; 22° C./72 hr | Isoplast ® 2530; wet annealed 60° C./24 hr |
|---|---|---|---|---|---|
| Absorbed Water (%) | (as is) | 1 | 1 | 1 | 1 |
| Tg, ° C. | 84 | 78 | 75 | 78 | 77 |
| DSC heat flow (normalized, W/g) | −0.081 | −0.055 | −0.13 | −0.059 | −0.16 |
| Stress Relaxation at 24 hours (%) | 60.8 | 68.1 | 31.8 | 73.5 | 28.2 |

The samples wet-treated at 22° C. for 72 hours show that water uptake into the polyurethane polymer article causes a determiental increase in stress relaxation (68.1% vs 60.8% for the control). This result may be interpreted in terms of loss in polymer ordering (DSC heat flow drop from −0.081 W/g to −0.055 W/g) as water is absorbed at room temperature. By comparison, water absorption at 60° C. (15° C. below TgW) is accompanied enhanced stress relaxation performance, 31.8% vs 60.8% for Estane® and 28.2% vs. 73.5% for Isoplast®.

Example 13

Heat Treatment and Analysis of Thermoplastic Elastomeric Polymer Article

A polymeric article formed from a polyvinylchloride-polyurethane elastomer blend is heated 15° C. below the wet glass transition temperature of the elastomer for 24 hours in a 100% relative humidity environment. A control polymer article was left untreated. After the wet annealing period, the treated article and the control article are tested for stress relaxation properties according to the procedure according to the method described above. The treated article and the control article are also tested for compression set under constant deflection according to ASTM D385 method B. The control has a permanent set of 7 mm while the wet annealed sample has less than 1 mm set.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

It is claimed:

1. A method for reducing stress relaxation in a rigid, amorphous polymer article, comprising:
   determining a glass transition temperature of the polymer article; and
   adjusting a temperature of the polymer article to a temperature that is between about 5° C. to about 25° C. lower than the glass transition temperature for a time sufficient to reduce stress relaxation;
   whereby said adjusting reduces stress relaxation in the article by at least about 20% as compared to the stress relaxation of the article before adjusting the temperature.

2. The method according to claim 1, wherein said determining comprises determining a dry glass transition temperature of a polymer having a percent moisture uptake of less than about 0.4%.

3. The method according to claim 2, wherein said adjusting is conducted at a relative humidity of less than 5%.

4. The method according to claim 2, wherein said determining and said adjusting comprise determining and adjusting a polymer article composed of a polymer selected from the group consisting of polycarbonate and polyester.

5. The method according to claim 1, further comprising contacting the polymer article with an aqueous fluid at a temperature of at least about 20° C. for at least about 24 hours prior to said determining.

6. The method according to claim 5, wherein said determining comprises determining a wet glass transition temperature of the polymer article after said contacting.

7. The method according to claim 5, wherein said adjusting is conducted at a relative humidity of greater than about 90%.

8. The method according to claim 1, further including thermoforming, prior to said adjusting, said article into a geometry.

9. The method according to claim 8, wherein said thermoforming is achieved using a rigid mold and said adjusting includes adjusting said article while in contact with said mold for at least a portion of said adjusting time.

10. The method according to claim 8, wherein said method further comprises cooling said thermoformed article to ambient temperature or lower after said step of thermoforming and prior to said adjusting.

11. The method according to claim 1, wherein said method further comprises determining the percent moisture uptake of the polymer article and said adjusting is conducted at a temperature that is from about [TgD−(5+(20*percent moisture uptake))] to about [TgD−(30+(20*percent moisture uptake))], where TgD is the dry glass transition temperature of the polymer article and the moisture uptake is a percent weight gain after 24 hours immersion in water at 25° C.

12. The method according to claim 1, further comprising contacting the polymer article with an aqueous fluid at a temperature of at least about 20° C. for at least about 24 hours prior to said determining, and said adjusting comprises heating the article in a wet environment to a temperature of between about 65-145° C.

13. The method according to claim 1, wherein said determining comprises determining a glass transition temperature of a polymer article having a percent moisture uptake of greater than about 0.4% and less than about 3% and said adjusting comprises heating the polymer to a temperature of between about 55-115° C.

14. The method according to claim 13, wherein said polymer is a rigid thermoplastic polyurethane.

15. The method according to claim 1, wherein said method further includes cooling the polymer article, after said adjusting, to a temperature of ambient temperature or below.

16. An article prepared according to the method of claim 1, said article comprised of a polyurethane, a polymethylmethacrylate, a polyester, a polyamide, a polyimide, or a polyurea.

17. An article prepared according to the method of claim 1, wherein said polymer article is comprised of a polyurethane having less than 10% soft segments.

18. A polymer article having reduced stress relaxation, said article comprised of a polymer having a percent moisture uptake of less than about 0.4%, and said article obtained by adjusting a temperature of the article to a temperature that is between about 5-25° C. lower than the dry glass transition temperature of the polymer for a time sufficient to achieve a reduction in stress relaxation by at least about 20% relative to the stress relaxation of the article prior to adjusting.

19. The article according to claim 18, wherein said article has a glass transition temperature of between about 120-160° C.

20. The article according to claim 18, wherein said article is comprised of a polycarbonate.

21. A polymer article having reduced stress relaxation, said article comprised of a polymer selected from the group consisting of polyurethanes, polyamides, polyimides, polycarbonates, polyesters, polyureas, and polyether diols, the polymer having a percent moisture uptake of equal to or greater than about 0.4% and equal to or less than about 3%, and said article obtained by adjusting a temperature of the article to a temperature that is between about 5-25° C. lower than the wet glass transition temperature of the polymer for a time sufficient to achieve a reduction in stress relaxation by at least about 20% relative to the stress relaxation of the article prior to adjusting.

22. The article according to claim 11, wherein said article has a wet glass transition temperature of between about 65-120° C.

23. The article according to claim 21, wherein said article is comprised of a polyurethane.

24. The article according to claim 23, wherein said polyurethane is prepared from one or more diols selected from the group consisting of 1,4 butanediol, 1,6 hexanediol, propylene glycol, dipropylene glycol, and 1,4-cyclohexanedimethanol.

25. The article according to claim 23, wherein said polyurethane is prepared from 1,4-cyclohexanedimethanol.

26. The article according to claim 23, wherein said polyurethane is a rigid polyurethane.

27. The article according to claim 21, wherein the article is a medical device for contacting moisture or bodily fluids.

28. The article according to claim 21, wherein the article is an orthodontic device.

29. The article according to claim 23, wherein said polymer article is comprised of a rigid polyurethane having less than 10% soft segments.

30. The article according to claim 23, wherein said polyurethane is a reaction product of 4,4'-diphenylmethane diisocyanate and 1,6 hexanediol.

31. The article according to claim 23, wherein said polyurethane is a rigid thermoplastic polyurethane.

32. The article according to claim 21, wherein said polymer is a polyamide and said article is an orthodontic device.

33. The article according to claim 23, wherein the article is a medical device for contacting moisture or bodily fluids.

34. The article according to claim 33, wherein the article is an orthodontic device.

* * * * *